(12) United States Patent
Ko et al.

(10) Patent No.: US 10,534,467 B2
(45) Date of Patent: Jan. 14, 2020

(54) TOUCH SENSOR

(71) Applicant: Samsung Display Co., Ltd., Yongin-si (KR)

(72) Inventors: Jun Young Ko, Yongin-si (KR); Tae Joon Kim, Yongin-si (KR); Sang Kook Kim, Yongin-si (KR); Eung Kwan Lee, Yongin-si (KR); Hyun Wook Cho, Yongin-si (KR); Eun Sol Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 182 days.

(21) Appl. No.: 15/643,442

(22) Filed: Jul. 6, 2017

(65) Prior Publication Data

US 2018/0011582 A1 Jan. 11, 2018

(30) Foreign Application Priority Data

Jul. 8, 2016 (KR) .......................... 10-2016-0086736

(51) Int. Cl.
*G06F 3/041* (2006.01)
(52) U.S. Cl.
CPC .......... *G06F 3/0414* (2013.01); *G06F 3/0412* (2013.01); *G06F 2203/04103* (2013.01)
(58) Field of Classification Search
CPC ...... G06F 3/0414; G06F 3/0412; G06F 3/041; G06F 3/044; G06F 3/045
See application file for complete search history.

(56) References Cited

U.S. PATENT DOCUMENTS

| | | | |
|---|---|---|---|
| 9,001,082 B1 * | 4/2015 | Rosenberg | ............ G06F 3/0414 |
| | | | 178/18.05 |
| 2006/0197753 A1 | 9/2006 | Hotelling | |
| 2012/0007832 A1 | 1/2012 | Lee et al. | |
| 2015/0153895 A1 | 6/2015 | Hotelling | |
| 2015/0185902 A1 * | 7/2015 | Liu | ........................ G06F 3/044 |
| | | | 345/174 |
| 2015/0370398 A1 | 12/2015 | Perlin et al. | |
| 2016/0224165 A1 * | 8/2016 | Koo | ........................ G06F 3/044 |
| 2017/0220162 A1 | 8/2017 | Ko et al. | |

FOREIGN PATENT DOCUMENTS

| | | |
|---|---|---|
| KR | 10-1035967 | 5/2011 |
| KR | 10-2017-0091213 | 8/2017 |

OTHER PUBLICATIONS

Sensel, Current Testing for the Sensel Morph, Senselblog, https://senselblog.wordpress.com, Sep. 22, 2015.

* cited by examiner

*Primary Examiner* — Kent W Chang
*Assistant Examiner* — Chayce R Bibbee
(74) *Attorney, Agent, or Firm* — H.C. Park & Associates, PLC

(57) ABSTRACT

Disclosed is a touch sensor, including: first sensing patterns extended in a first direction and arranged in a second direction crossing the first direction, in which each of the first sensing patterns includes: first variable resistive patterns arranged in the first direction; and first conductive patterns connecting the first variable resistive patterns, and lengths of the first variable resistive patterns in the first direction are increased in the second direction.

20 Claims, 20 Drawing Sheets

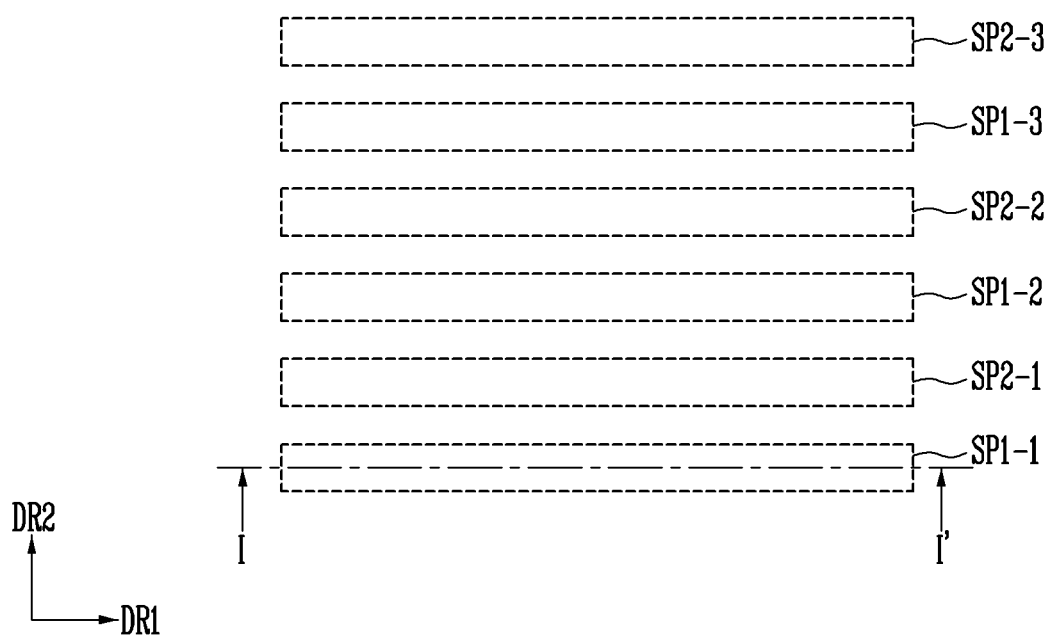

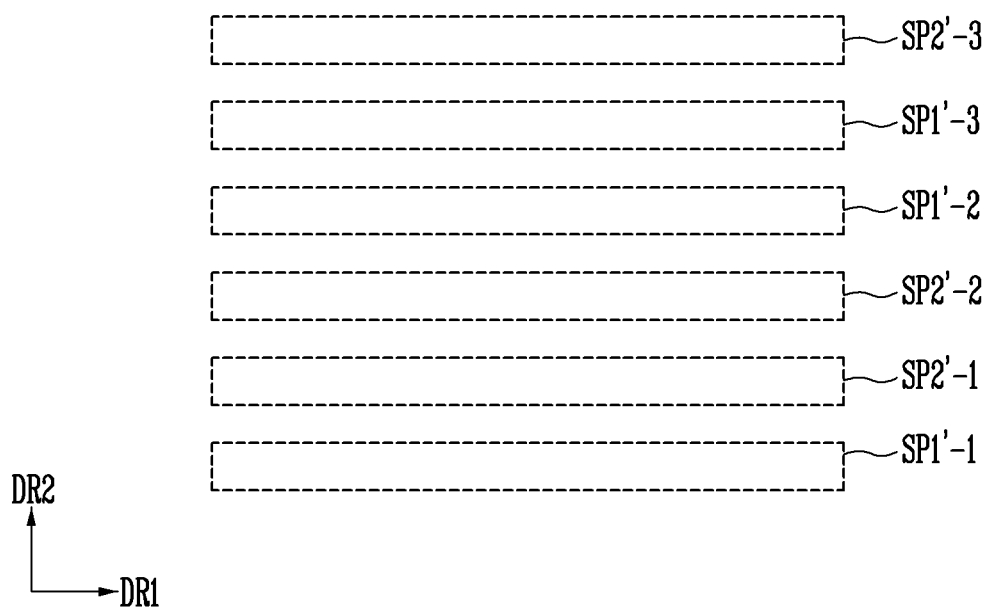

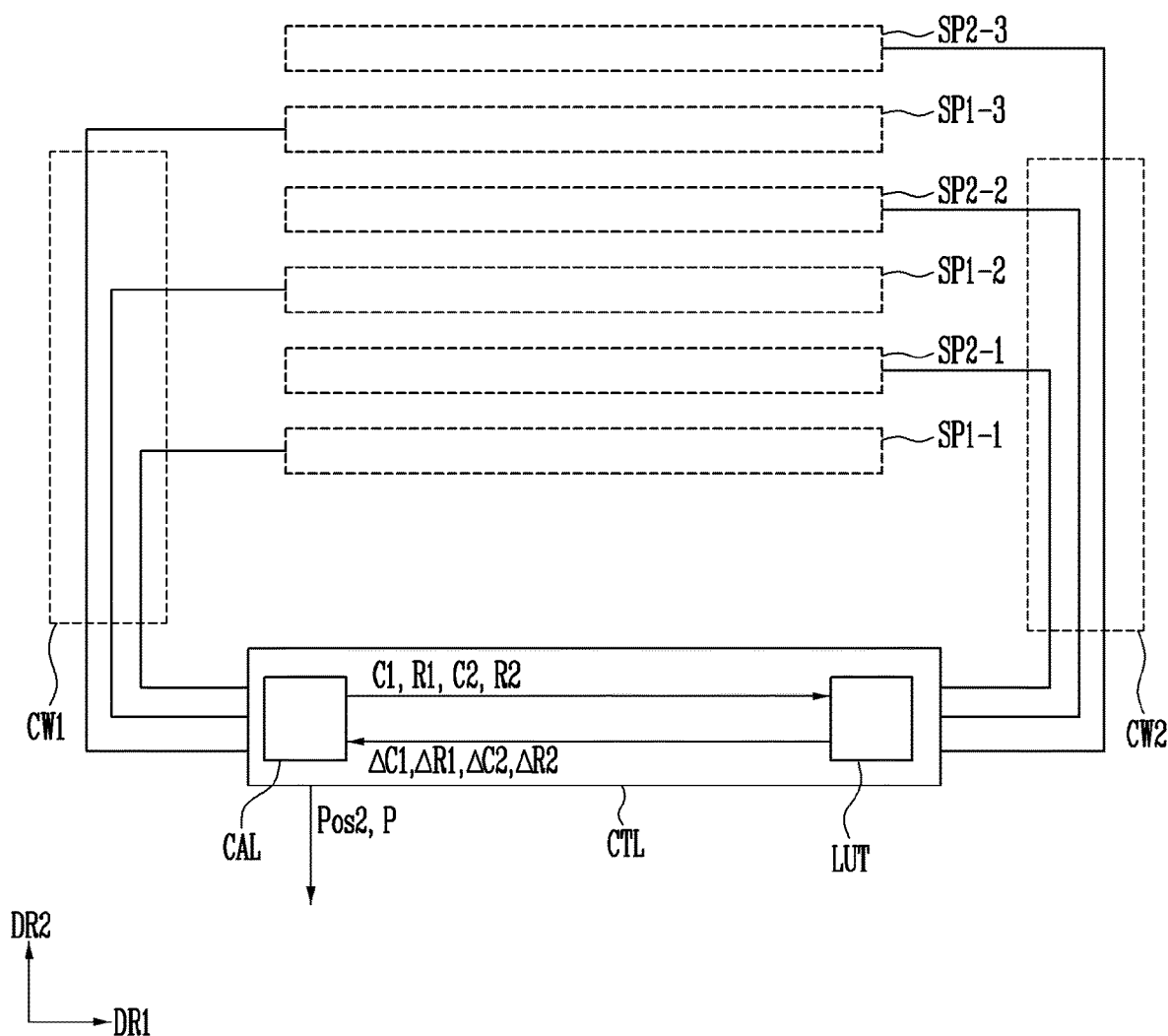

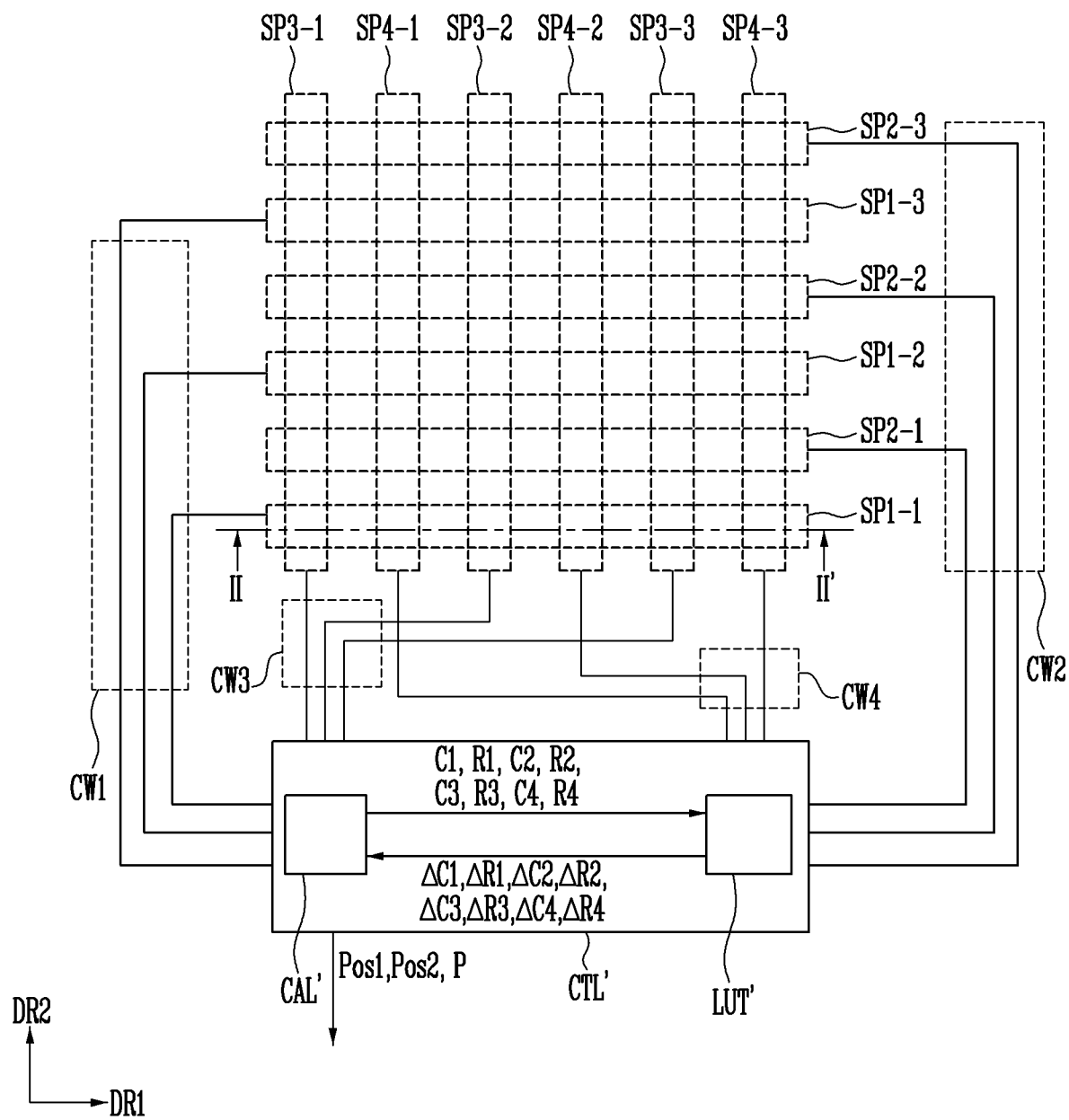

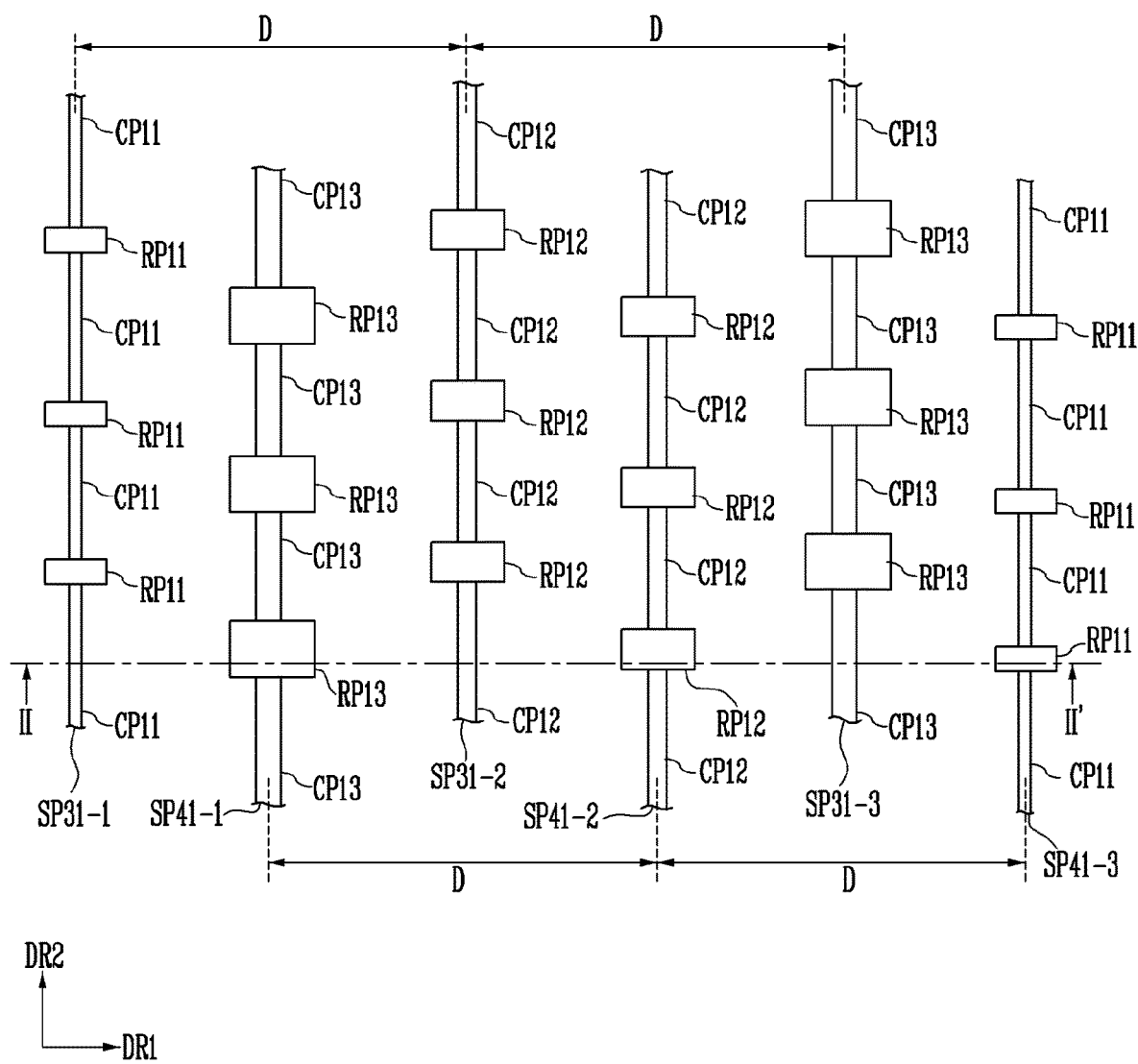

TOUCH SENSOR

CROSS-REFERENCE TO RELATED APPLICATION

This application claims priority from and the benefit of Korean Patent Application No. 10-2016-0086736, filed on Jul. 8, 2016, which is hereby incorporated by reference for all purposes as if fully set forth herein.

BACKGROUND

Field

Exemplary embodiments relate to a touch sensor.

Discussion of the Background

According to the development of smart devices, a touch sensor, which is capable of determining a position of a touch when a finger of a user or an object is in contact with a display device, is required to be embedded in the display device.

Recently, it is desirable for the touch sensor embedded in the display device to recognize a hovering of a user and detect a pressure applied by a touch of the user, as well as a position of a touch of the user.

However, in order for the touch sensor to recognize all of the touch, the hovering, and the pressure of the user, there is a need to increase the number of layers included in the touch sensor may be increased, or increase the number of channels.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensor, which has a simple structure, including a decreased number of layers and a decreased number of required channels.

Additional aspects will be set forth in the detailed description which follows, and, in part, will be apparent from the disclosure, or may be learned by practice of the inventive concept.

According to exemplary embodiments, a touch sensor includes: first sensing patterns extended in a first direction and arranged in a second direction crossing the first direction, in which each of the first sensing patterns includes: first variable resistive patterns arranged in the first direction; and first conductive patterns connecting the first variable resistive patterns, and lengths of the first variable resistive patterns in the first direction are increased in the second direction.

According to the exemplary embodiment of the present disclosure, it is possible to provide the touch sensor, which has a simple structure, includes the decreased number of layers, and includes the decreased number of required channels.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 3A is a diagram of a touch sensor according to another exemplary embodiment of the present disclosure.

FIG. 5A is a diagram of a touch sensor according to another exemplary embodiment of the present disclosure.

FIGS. 7A and 7B are diagrams of a touch sensor according to another exemplary embodiment of the present disclosure.

FIGS. 8A and 8B are diagrams of a touch sensor according to another exemplary embodiment of the present disclosure.

FIG. 8D is a diagram of an exemplary embodiment of third sensing patterns and fourth sensing patterns of the touch sensor of FIGS. 8A and 8B.

DETAILED DESCRIPTION OF THE ILLUSTRATED EMBODIMENTS

Figure 1:
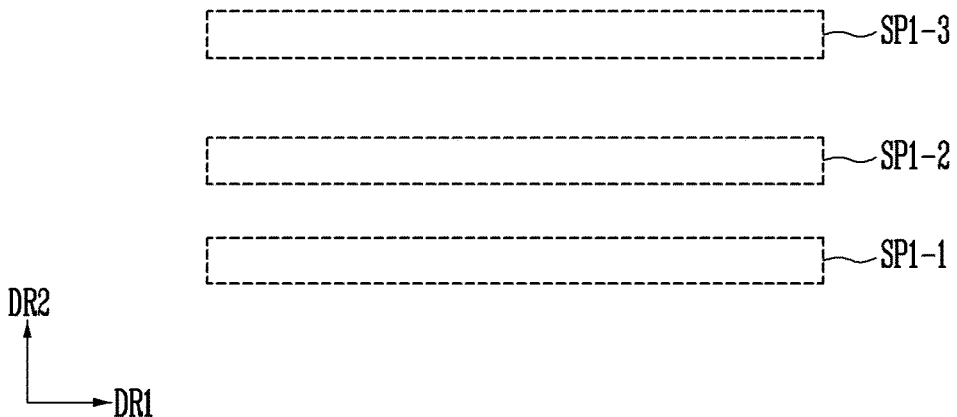
FIG. 1 is a diagram of a touch sensor according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram of a touch sensor according to an exemplary embodiment of the present disclosure.

The touch sensor according to the exemplary embodiment of the present disclosure includes first sensing patterns SP1-1, SP1-2, and SP1-3. FIG. 1 illustrates only three first sensing patterns SP1-1, SP1-2, and SP1-3, however, the number of first sensing patterns may be more than 3.

The first sensing patterns SP1-1, SP1-2, and SP1-3 (hereinafter, referred to as SP1) may be extended in a first direction DR1, and may be arranged in a second direction DR2 crossing the first direction DR1.

Each of the first sensing patterns SP1-1, SP1-2, and SP1-3 may have a first capacitance and a first resistance value. Further, a sum of the first capacitance of the first sensing patterns SP1 may be defined as total first capacitance, and a sum of the first resistance values of the first sensing patterns SP1 may be defined as a total first resistance value.

Each of the first first sensing pattern SP1-1, the second first sensing pattern SP1-2, and the third first sensing pattern SP1-3 may have a self-capacitance and a mutual capacitance. To use the second first sensing pattern SP1-2, the first capacitance of the second first sensing pattern SP1-2 may be the self-capacitance of the second first sensing pattern SP1-2, the mutual capacitance between the second first sensing pattern SP1-2 and the third first sensing pattern SP1-3 adjacent to the second first sensing pattern SP1-2 in the second direction DR2, and the mutual capacitance between the second first sensing pattern SP1-2 and the first first sensing pattern SP1-1 adjacent to the second first sensing pattern SP1-2 in an opposite direction to the second direction DR2.

The first resistance value of each of the first sensing patterns SP1-1, SP1-2, and SP1-3 may be a resistance value between both terminals of each of the first sensing patterns SP1-1, SP1-2, and SP1-3 based on the first direction DR1.

When a user touches the first sensing pattern SP1-2 by using a conductive object (for example, a finger) with a predetermined pressure, the first capacitance of the first sensing pattern SP1-1 and the first resistance value of the first sensing pattern SP1-1 may be changed by the touch and the pressure.

When the user makes the conductive object hover around the first sensing pattern SP1-2, the first capacitance of the first sensing pattern SP1-2 may be changed by the hovering. In the present specification, the case where an object is disposed around the sensing pattern without touching the sensing pattern is defined as the hovering.

The first capacitance of the first sensing patterns SP1-1, SP1-2, and SP1-3 may be increased or decreased in the second direction DR2. Further, the first resistance values of the first sensing patterns SP1-1, SP1-2, and SP1-3 may be increased or decreased in the second direction DR2.

Even though a pressure applied to the first first sensing pattern SP1-1, a pressure applied to the second first sensing pattern SP1-2, and a pressure applied to the third first sensing pattern SP1-3 may be the same as one another, a variation of the first capacitance of each of the first sensing patterns SP1-1, SP1-2, and SP1-3 may also be increased or decreased in the second direction DR2.

Otherwise, even though a pressure applied to the first first sensing pattern SP1-1, a pressure applied to the second first sensing pattern SP1-2, and a pressure applied to the third first sensing pattern SP1-3 are the same as one another, a variation of the first resistance value of each of the first sensing patterns SP1-1, SP1-2, and SP1-3 may also be increased or decreased in the second direction DR2.

Particularly, a shape of each of the first sensing patterns SP1-1, SP1-2, SP1-3 will be described in detail below with reference to FIGS. 2A, 2B, 2C, 2D, and 2E.

Figure 2A:
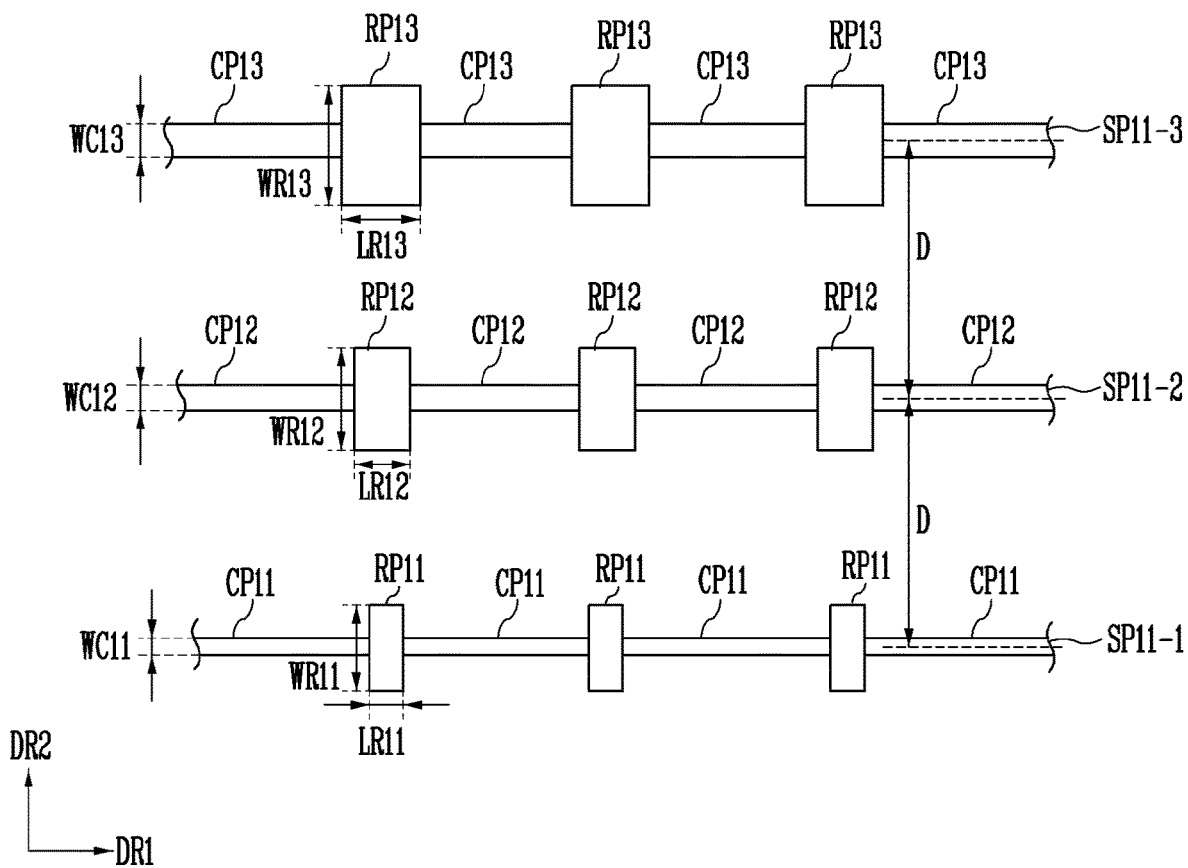
FIG. 2A is a diagram of an exemplary embodiment of first sensing patterns of the touch sensor of FIG. 1.

FIG. 2A is a diagram for describing an exemplary embodiment of first sensing patterns of the touch sensor of FIG. 1. The first sensing patterns SP1-1, SP1-2, SP1-3 illustrated in FIG. 1 may correspond to first sensing patterns SP11-1, SP11-2, and SP11-3 (hereinafter, SP11) illustrated in FIG. 2A, respectively.

Referring to FIG. 2A, the first first sensing pattern SP11-1 may include first variable resistive patterns RP11 arranged in the first direction and first conductive patterns CP11 connecting the first variable resistive patterns RP11. The second first sensing pattern SP11-2 may include first variable resistive patterns RP12 arranged in the first direction, and first conductive patterns CP12 connecting the first variable resistive patterns RP12. The third first sensing pattern SP11-3 may include first variable resistive patterns RP13 arranged in the first direction and first conductive patterns CP13 connecting the first variable resistive patterns RP13.

The first variable resistive patterns RP11, RP12, and RP13 may include a material having piezoresistivity. A zinc oxide (ZnO) and the like may be used as the material having piezoresistivity. The first variable resistive patterns RP11, RP12, and RP13 may also include a plurality of constitutive elements. A detailed structure of each of the first variable resistive patterns RP11, RP12, and RP13 when the first variable resistive patterns RP11, RP12, and RP13 has the plurality of constitutive elements will be described in detail below with reference to FIG. 3C.

The first conductive patterns CP11, CP12, and CP13 may include at least one of a metal, an alloy of two or more metal, a conductive oxide, and a nano material. At least one in the group consisting of gold (Au), silver (Ag), aluminum (Al), molybdenum (Mo), chrome (Cr), titanium (Ti), nickel (Ni), neodymium (Nd), copper (Cu), and platinum (Pt) may be used as the metal. At least one in the group consisting of an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$) may be used as the conductive oxide. At least one in the group consisting of nano wire (AgNW), a carbon nano tube, and graphene may be used as the nano material.

The first conductive patterns CP11, CP12, and CP13 may allow light to pass through. The first conductive patterns CP11, CP12, and CP13 may also include a material allowing light to pass through. However, although the first conductive patterns CP11, CP12, and CP13 may include a material disallowing light to pass through, the first conductive patterns CP11, CP12, and CP13 may be formed in a mesh form to allow light to pass through.

As illustrated in FIG. 2A, a width WR12 of the first variable resistive patterns RP12 in the second direction DR2 is larger than a width WR11 of the first variable resistive patterns RP11 in the second direction DR2 and is smaller than a width WR13 of the first variable resistive patterns RP13 in the second direction DR2.

As illustrated in FIG. 2A, a length LR12 of the first variable resistive patterns RP12 in the first direction DR1 is larger than a length LR11 of the first variable resistive patterns RP11 in the first direction DR1 and is smaller than a length LR13 of the first variable resistive patterns RP13 in the first direction DR1.

As illustrated in FIG. 2A, a width WC12 of the first conductive patterns CP12 in the second direction DR2 is larger than a width WC11 of the first conductive patterns CP11 in the second direction DR2 and is smaller than a width WC13 of the first conductive patterns CP13 in the second direction DR2.

The lengths LR11, LR12, and LR13 of the first variable resistive patterns RP11, RP12, and RP13 in the first direction DR1 and the widths WR11, WR12, and WR13 of the first variable resistive patterns RP11, RP12, and RP13 in the second direction DR2 may be increased in the second direction DR2. The widths WC11, WC12, and WC13 of the first conductive patterns CP11, CP12, and CP13 in the second direction DR2 may be increased in the second direction DR2.

Referring to FIG. 2A, a distance D between the adjacent first first sensing pattern SP11-1 and second first sensing pattern SP11-2 is the same as a distance D between the adjacent second first sensing pattern SP11-2 and third first sensing pattern SP11-3.

A total area of the first conductive patterns CP11, CP12, and CP13 and a total area of the first variable resistive patterns RP11, RP12, and RP13 in the first direction DR1 may be increased in the second direction DR2, and the distance D between the adjacent first sensing patterns is uniform. Accordingly, the first capacitance of each of the first sensing patterns SP11-1, SP11-2, and SP11-3 may be increased in the second direction DR2.

Accordingly, even though a pressure applied to the first first sensing pattern SP11-1, a pressure applied to the second first sensing pattern SP11-2, and a pressure applied to the third first sensing pattern SP11-3 are the same as one another, and an area of the first first sensing pattern SP11-1 touched, an area of the second first sensing pattern SP11-2 touched, and an area of the third first sensing pattern SP11-3 touched are the same as one another, a variation of the first capacitance of each of the first sensing patterns SP11-1, SP11-2, and SP11-3 may be increased in the second direction DR2.

Further, even though an area hovering around the first first sensing pattern SP11-1, an area hovering around the second first sensing pattern SP11-2, and an area of the third first sensing pattern SP11-3 hovering are the same as one another, and the distance between the object hovering the first first sensing pattern SP11-1, the distance between the object hovering the second first sensing pattern SP11-2, and the distance between the object hovering third first sensing pattern SP11-3 are the same as one another, a variation of the first capacitance of each of the first sensing patterns SP11-1, SP11-2, and SP11-3 may be increased in the second direction DR2.

Even though a pressure applied to the first first sensing pattern SP11-1, a pressure applied to the second first sensing pattern SP11-2, and a pressure applied to the third first sensing pattern SP11-3 are the same as one another, and an area of the first first sensing pattern SP11-1 touched, an area of the second first sensing pattern SP11-2 touched, and an area of the third first sensing pattern SP11-3 touched are the same as one another, an area of the first variable resistive patterns RP12 influenced by the touch may be larger than an area of the first variable resistive patterns RP11 influenced by the touch and may be smaller than an area of the first variable resistive patterns RP13 influenced by the touch. Accordingly, a variation of the first resistance value of each of the first sensing patterns SP11-1, SP11-2, and SP11-3 may be increased in the second direction DR2.

Figure 2B:
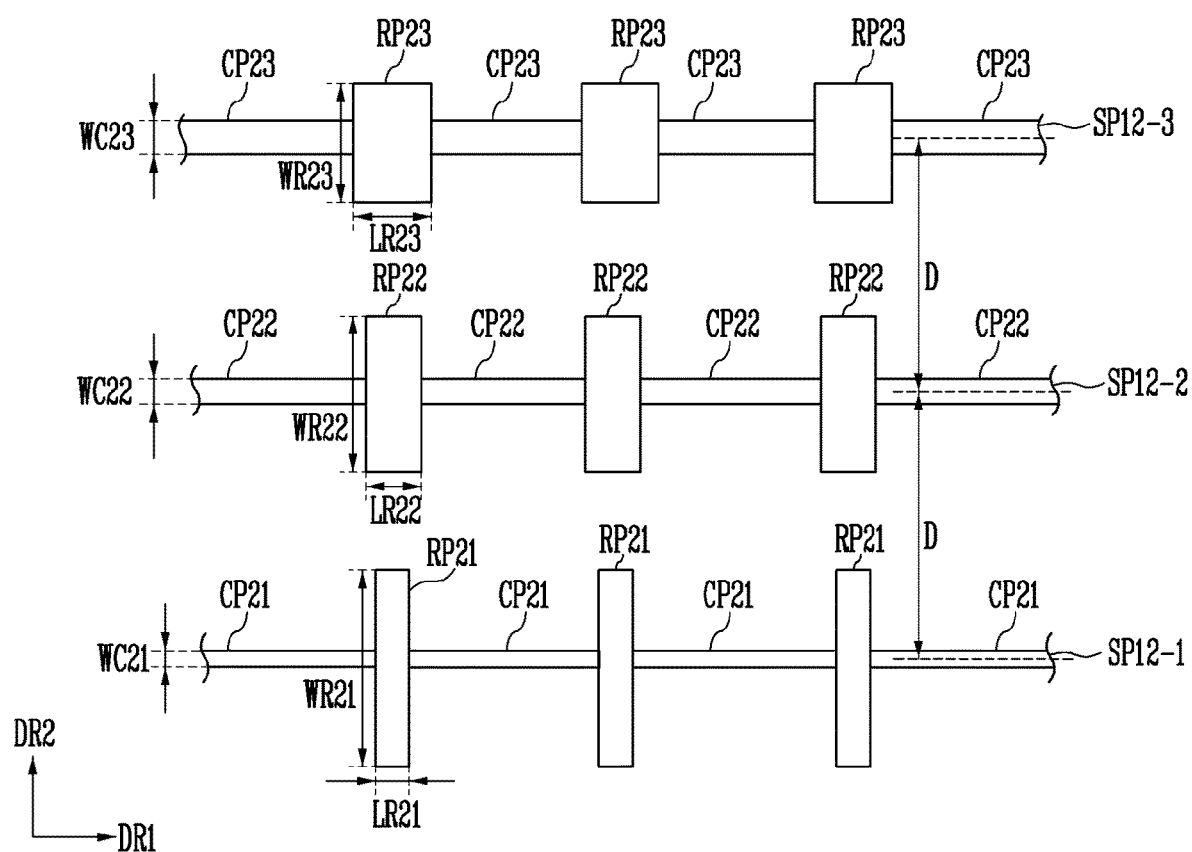
FIG. 2B is a diagram of another exemplary embodiment of first sensing patterns of the touch sensor of FIG. 1.

FIG. 2B is a diagram of another exemplary embodiment of first sensing patterns of the touch sensor of FIG. 1. The first sensing patterns SP1-1, SP1-2, SP1-3 illustrated in FIG. 1 may correspond to first sensing patterns SP12-1, SP12-2, and SP12-3 (hereinafter, SP12) illustrated in FIG. 2B, respectively.

Referring to FIG. 2B, the first first sensing pattern SP12-1 includes first variable resistive patterns RP21 arranged in the first direction and first conductive patterns CP21 connecting the first variable resistive patterns RP21. The second first sensing pattern SP12-1 includes first variable resistive patterns RP22 arranged in the first direction and first conductive patterns CP22 connecting the first variable resistive patterns RP22. The third first sensing pattern SP12-3 includes first variable resistive patterns RP23 arranged in the first direction and first conductive patterns CP23 connecting the first variable resistive patterns RP23.

As illustrated in FIG. 2B, a width WR22 of the first variable resistive patterns RP22 in the second direction DR2 is smaller than a width WR21 of the first variable resistive patterns RP21 in the second direction DR2 and is larger than a width WR23 of the first variable resistive patterns RP23 in the second direction DR2.

As illustrated in FIG. 2B, a length LR22 of the first variable resistive patterns RP22 in the first direction DR1 is larger than a length LR21 of the first variable resistive patterns RP21 in the first direction DR1 and is smaller than a length LR23 of the first variable resistive patterns RP23 in the first direction DR1.

As illustrated in FIG. 2B, a width WC22 of the first conductive patterns CP22 in the second direction DR2 is larger than a width WC21 of the first conductive patterns CP21 in the second direction DR2 and is smaller than a width WC23 of the first conductive patterns CP23 in the second direction DR2.

The lengths LR21, LR22, and LR23 of the first variable resistive patterns RP21, RP22, and RP23 in the first direction DR1 may be increased in the second direction DR2. The widths WC21, WC22, and WC23 of the first conductive patterns CP21, CP22, and CP23 in the second direction DR2 may be increased in the second direction DR2. The widths WR21, WR22, and WR23 of the first variable resistive patterns RP21, RP22, and RP23 in the second direction DR2 may be decreased in the second direction DR2.

Resistance values of the first variable resistive patterns RP21, RP22, and RP23 in the first direction DR1 may be proportional to the lengths of the first variable resistive patterns RP21, RP22, and RP23 in the first direction DR1 and may be inversely proportional to the widths of the first variable resistive patterns RP21, RP22, and RP23 in the second direction DR2. Accordingly, the resistance value of each of the first variable resistive patterns RP21, RP22, and RP23 in the first direction DR1 may be increased in the second direction DR2.

Referring to FIG. 2B, a distance D between the adjacent first first sensing pattern SP21-1 and second first sensing pattern SP12-2 is the same as a distance D between the adjacent second first sensing pattern SP12-2 and third first sensing pattern SP12-3.

A total area of the first conductive patterns CP21, CP22, and CP23 and the resistance values of the first variable resistive patterns RP21, RP22, and RP23 in the first direction DR1 may be increased in the second direction DR2, and the distance D between the adjacent first sensing patterns may be the same.

Accordingly, the first capacitance of the second first sensing pattern SP12-2 may be larger than the first capacitance of the first first sensing pattern SP12-1 and may be smaller than the first capacitance of the third first sensing pattern SP12-3, and the first resistance value of the second first sensing pattern SP12-2 may be larger than the first resistance value of the first first sensing pattern SP12-1 and may be smaller than the first resistance value of the third first sensing pattern SP12-3.

Even though a pressure applied to the first first sensing pattern SP12-1, a pressure applied to the second first sensing pattern SP12-2, and a pressure applied to the third first sensing pattern SP12-3 may be the same as one another, and an area of the first first sensing pattern SP12-1 touched, an area of the second first sensing pattern SP12-2 touched, and an area of the third first sensing pattern SP12-3 touched may be the same as one another, a variation of the first capacitance of each of the first sensing patterns SP12-1, SP12-2, and SP12-3 may be increased in the second direction DR2.

Further, even though an area of hovering around the first first sensing pattern SP12-1, an area of hovering around the second first sensing pattern SP12-2, and an area of hovering around the third first sensing pattern SP12-3 are the same as one another, and a distance between the first first sensing pattern SP12-1 and a hovering object, a distance between the second first sensing pattern SP12-2 and the hovering object, and a distance between the third first sensing pattern SP12-3 and the hovering object are the same as one another, a variation of the first capacitance of each of the first sensing patterns SP12-1, SP12-2, and SP12-3 may be increased in the second direction DR2.

Even though the pressure applied to the first first sensing pattern SP12-1, the pressure applied to the second first sensing pattern SP12-2, and the pressure applied to the third first sensing pattern SP12-3 are the same as one another, and the area of the first first sensing pattern SP12-1 touched, the area of the second first sensing pattern SP12-2 touched, and the area of the third first sensing pattern SP12-3 touched are the same as one another, the first resistance value of the second first sensing pattern SP12-2 may be larger than the first resistance value of the first first sensing pattern SP12-1 and may be smaller than the first resistance value of the third first sensing pattern SP12-3, so that the variation of the first resistance value of each of the first sensing patterns SP12-1, SP12-2, and SP12-3 may be increased in the second direction DR2. a variation of the first capacitance of each of the first sensing patterns SP12-1, SP12-2, and SP12-3 may be increased in the second direction DR2.

Figure 2C:
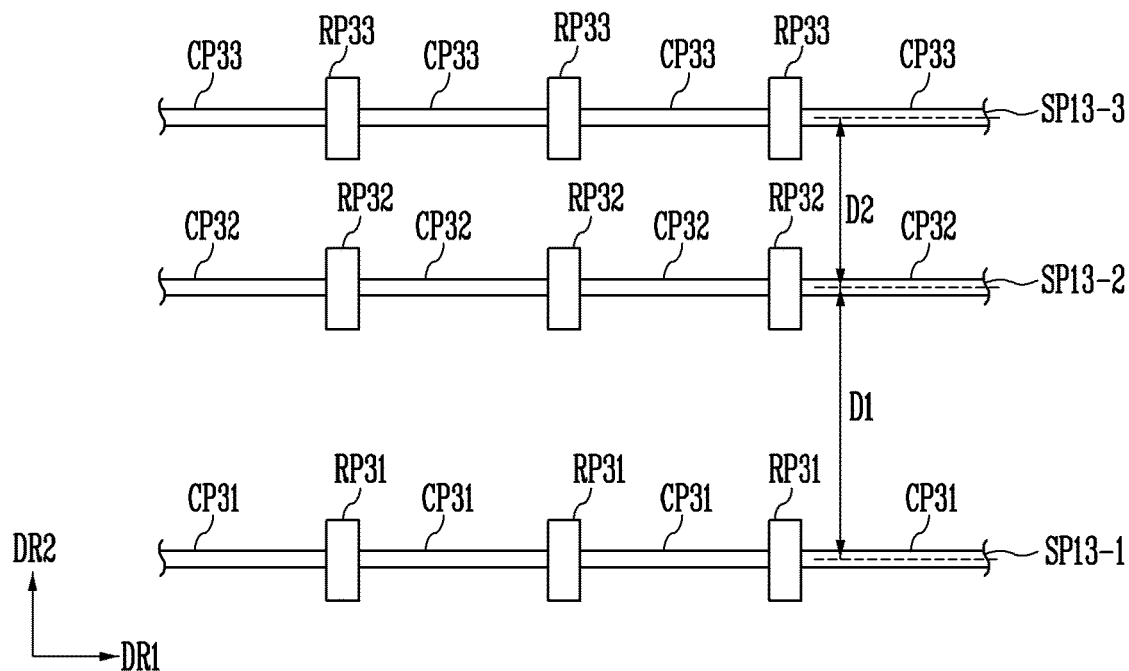
FIG. 2C is a diagram of another exemplary embodiment of first sensing patterns of the touch sensor of FIG. 1.

FIG. 2C is a diagram of another exemplary embodiment of first sensing patterns of the touch sensor of FIG. 1. The first sensing patterns SP1-1, SP1-2, SP1-3 illustrated in FIG. 1 may correspond to first sensing patterns SP13-1, SP12-2, and SP13-3 (hereinafter, SP13) illustrated in FIG. 2C, respectively.

Referring to FIG. 2C, the first first sensing pattern SP13-1 includes first variable resistive patterns RP31 arranged in the first direction and first conductive patterns CP31 connecting the first variable resistive patterns RP31. The second first sensing pattern SP13-1 includes first variable resistive patterns RP32 arranged in the first direction and first conductive patterns CP32 connecting the first variable resistive patterns RP32. The third first sensing pattern SP13-3 includes first variable resistive patterns RP33 arranged in the first direction and first conductive patterns CP33 connecting the first variable resistive patterns RP33.

The first conductive patterns CP31, CP32, and CP33 may have the same shape, and the first variable resistive patterns RP31, RP32, and RP33 may have the same shape.

A distance D1 between the adjacent first first sensing pattern SP13-1 and second first sensing pattern SP13-2 may be larger than a distance D2 between the adjacent second first sensing pattern SP13-2 and third first sensing pattern SP13-3. That is, the distance between the adjacent first sensing patterns may be decreased in the second direction DR2.

A size of mutual capacitance may be inversely proportional to a distance between two conductive objects, and the shapes of the first sensing patterns SP13-1, SP13-2, and SP13-3 may be the same, so that a variation of first capacitance by the same touch may be increased in the second direction DR2. Further, a variation of the first capacitance by the same hovering may also be increased in the second direction DR2.

FIG. 2C presents only three first sensing patterns SP13-1, SP13-2, and SP13-3, but the number of first sensing patterns may be more than 3. When a width of a region touched by a user in the second direction DR2 is relatively larger than the distance D1 between the adjacent first first sensing pattern SP13-1 and second first sensing pattern SP13-2, the first capacitance and first resistance values of the several first sensing patterns may be simultaneously changed by one touch.

The number of first sensing patterns, of which the first capacitance and the first resistance values are changed by each of the touches having the same shape and pressure, may be increased in the second direction DR2. Accordingly, a variation of total first capacitance and a variation of a total first resistance value of the first sensing patterns SP13 by each of the touches having the same shape and pressure may be increased in the second direction DR2.

Similarly, the variation of the total first capacitance of the first sensing patterns SP13 by each of the hoverings having the same shape and distance may be increased in the second direction DR2.

Figure 2D:
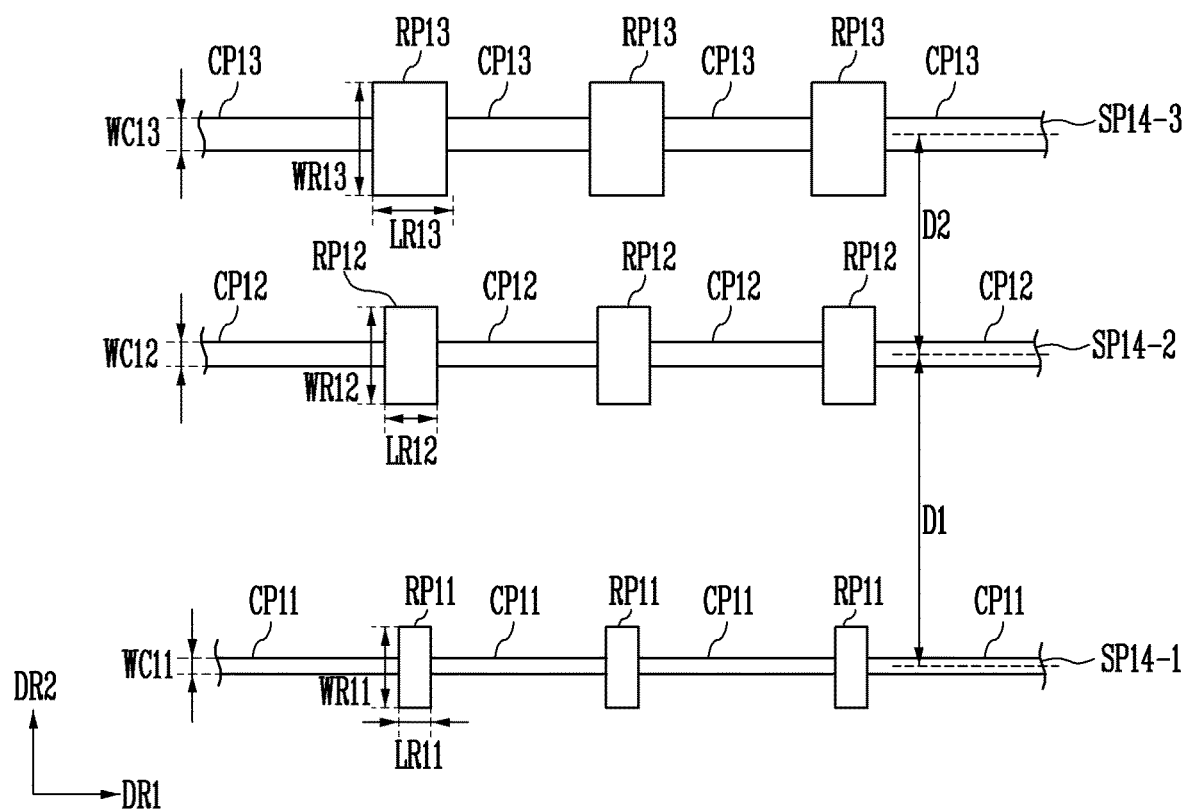
FIG. 2D is a diagram of another exemplary embodiment of first sensing patterns of the touch sensor of FIG. 1.

FIG. 2D is a diagram of another exemplary embodiment of first sensing patterns of the touch sensor of FIG. 1. The first sensing patterns SP1-1, SP1-2, SP1-3 illustrated in FIG. 1 may correspond to first sensing patterns SP14-1, SP14-2, and SP14-3 (hereinafter, SP14) illustrated in FIG. 2D, respectively.

As described with reference to FIG. 2A, lengths LR11, LR12, and LR13 of first variable resistive patterns RP11, RP12, and RP13 in the first direction DR1 and widths WR11, WR12, and WR13 of first variable resistive patterns RP11, RP12, and RP13 in the second direction DR2 may be increased in the second direction DR2. The widths WC11, WC12, and WC13 of the first conductive patterns CP11, CP12, and CP13 in the second direction DR2 may be increased in the second direction DR2.

Further, a distance D1 between the adjacent first first sensing pattern SP14-1 and second first sensing pattern SP14-2 may be larger than a distance D2 between the adjacent second first sensing pattern SP14-2 and third first sensing pattern SP14-3. That is, the distance between the adjacent first sensing patterns may be decreased in the second direction DR2. The first capacitance of each of the first sensing patterns SP14-1, SP14-2, and SP14-3 may be increased in the second direction DR2.

Even though a pressure applied to the first first sensing pattern SP14-1, a pressure applied to the second first sensing pattern SP14-2, and a pressure applied to the third first sensing pattern SP14-3 are the same as one another, and an area of the first first sensing pattern SP14-1 touched, an area of the second first sensing pattern SP14-2 touched, and an area of the third first sensing pattern SP14-3 touched are the same as one another, a variation of the first capacitance of each of the first sensing patterns SP14-1, SP14-2, and SP14-3 may be increased in the second direction DR2.

Further, even though an area hovering around the first first sensing pattern SP14-1, an area hovering around the second first sensing pattern SP14-1, and an area hovering around the third first sensing pattern SP14-3 are the same as one another, and a distance between the first first sensing pattern SP14-1 and a hovering object, a distance between the second first sensing pattern SP14-2 and a hovering object, and a distance between the third first sensing pattern SP14-3 and a hovering object are the same as one another, a variation of the first capacitance of each of the first sensing patterns SP14-1, SP14-2, and SP14-3 may be increased in the second direction DR2.

Even though a pressure applied to the first first sensing pattern SP14-1, a pressure applied to the second first sensing pattern SP14-2, and a pressure applied to the third first sensing pattern SP14-3 are the same as one another, and an area of the first first sensing pattern SP14-1 touched, an area of the second first sensing pattern SP14-2 touched, and an area of the third first sensing pattern SP14-3 touched are the same as one another, an area of the first variable resistive patterns RP12 influenced by the touch is larger than an area of the first variable resistive patterns RP11 influenced by the touch and is be smaller than an area of the first variable resistive patterns RP13 influenced by the touch. Accordingly, a variation of the first resistive value of each of the first sensing patterns SP14-1, SP14-2, and SP14-3 may be increased in the second direction DR2.

FIG. 2D presents only three first sensing patterns SP14-1, SP14-2, and SP14-3, but the number of first sensing patterns may be more than 3. When a user touches a relatively larger region than the width of each of the first sensing patterns SP14 in the second direction DR2, the first capacitance and the first resistance values of the several first sensing patterns may be simultaneously changed by one touch.

The number of first sensing patterns, of which the first capacitance and the first resistance values are changed by each of the touches having the same shape and pressure, may be increased in the second direction DR2. Accordingly, a variation of total first capacitance and a variation of a total first resistance value of the first sensing patterns SP14 by each of the touches having the same shape and pressure may be increased in the second direction DR2.

Similarly, the variation of the total first capacitance of the first sensing patterns SP14 by each of the hoverings having the same shape and distance may be increased in the second direction DR2.

Figure 2E:
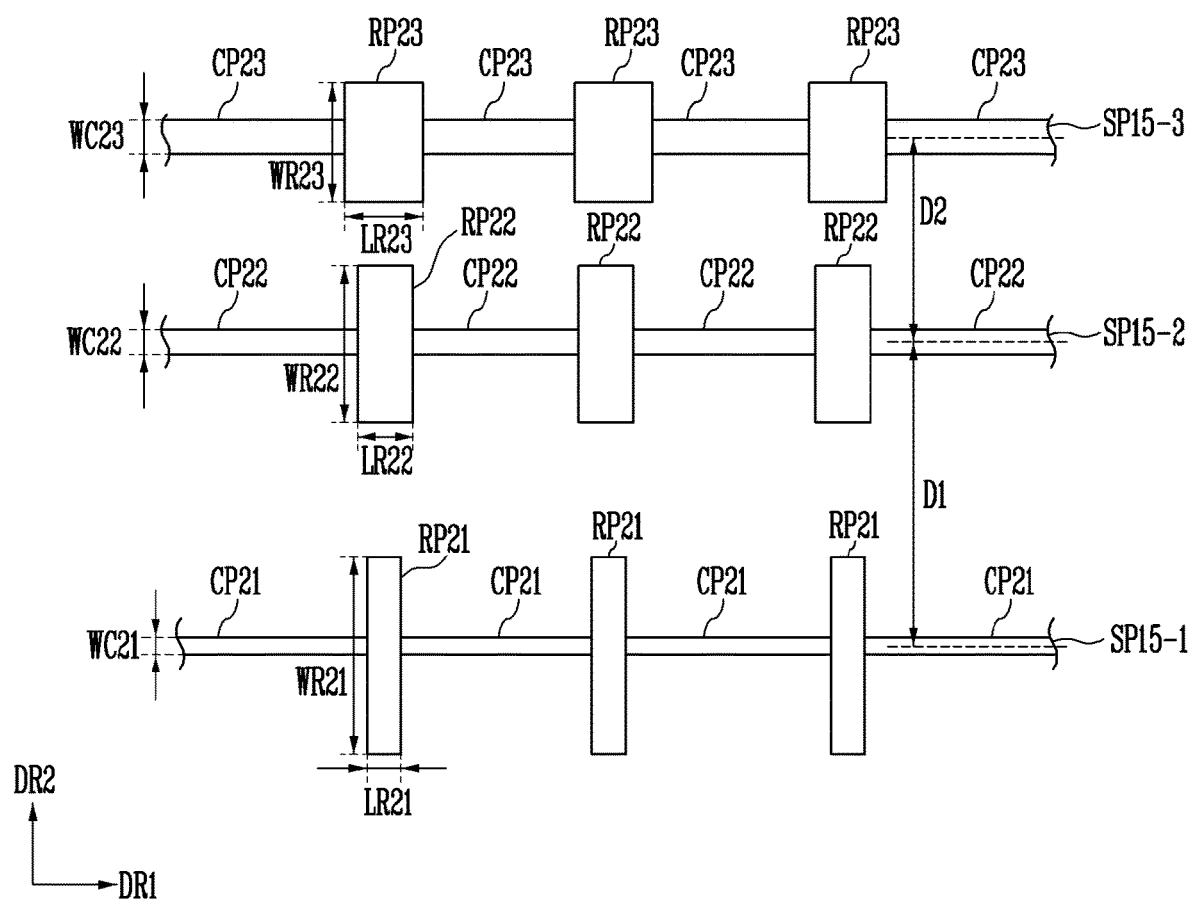
FIG. 2E is a diagram of another exemplary embodiment of first sensing patterns of the touch sensor of FIG. 1.

FIG. 2E is a diagram of another exemplary embodiment of first sensing patterns of the touch sensor of FIG. 1. The first sensing patterns SP1-1, SP1-2, SP1-3 illustrated in FIG. 1 may correspond to first sensing patterns SP15-1, SP15-2, and SP15-3 (hereinafter, SP14) illustrated in FIG. 2E, respectively.

As described with reference to FIG. 2B, lengths LR21, LR22, and LR23 of first variable resistive patterns RP21, RP22, and RP23 in the first direction DR1 may be increased in the second direction DR2. Widths WC21, WC22, and WC23 of first conductive patterns CP21, CP22, and CP23 in the second direction DR2 are increased in the second direction DR2. Widths WR21, WR22, and WR23 of the first variable resistive patterns RP21, RP22, and RP23 in the second direction DR2 may be decreased in the second direction DR2.

Further, referring to FIG. 2E, a distance D1 between the adjacent first first sensing pattern SP15-1 and second first sensing pattern SP15-2 is larger than a distance D2 between the adjacent second first sensing pattern SP15-2 and third first sensing pattern SP15-3. That is, the distance between the adjacent first sensing patterns may be decreased in the second direction DR2.

Accordingly, first capacitance of the second first sensing pattern SP15-2 may be larger than first capacitance of the first first sensing pattern SP15-1 and may be smaller than first capacitance of the third first sensing pattern SP15-3, and a first resistance value of the second first sensing pattern SP15-2 may be larger than a first resistance value of the first first sensing pattern SP15-1 and may be smaller than a first resistance value of the third first sensing pattern SP15-3.

FIG. 2E presents only three first sensing patterns SP15-1, SP15-2, and SP15-3, but the number of first sensing patterns may be more than 3. When a user touches a relatively larger region than the width of each of the first sensing patterns SP15 in the second direction DR2, the first capacitance and the first resistance values of the several first sensing patterns may be simultaneously changed by one touch.

As described with reference to FIG. 2C, the number of first sensing patterns, of which the first capacitance and the first resistance values are changed by each of the touches having the same shape and pressure, may be increased in the second direction DR2.

Accordingly, a variation of a total first capacitance and a variation of a total first resistance value of the first sensing patterns SP15 by each of the touches having the same shape and pressure may be increased in the second direction DR2, and a variation of the total first capacitance of the first sensing patterns SP15 by each of the hoverings having the same shape and distance may be increased in the second direction DR2.

FIG. 3A is a diagram of a touch sensor according to another exemplary embodiment of the present disclosure.

Referring to FIG. 3A, the touch sensor according to another exemplary embodiment of the present disclosure includes first sensing patterns SP1 and second sensing patterns SP2-1, SP2-2, and SP2-3 (hereinafter, referred to as SP2). The number of first sensing patterns and the number of second sensing patterns may be three or more.

The first sensing patterns SP1 and the second sensing patterns SP2 may be extended in a first direction DR1, and may be arranged in a second direction DR2 crossing the first direction DR1. Further, the first sensing patterns SP1 and the second sensing patterns SP2 may be alternately disposed.

Each of the second sensing patterns SP2-1, SP2-2, and SP2-3 may have a second capacitance and a second resistance value. Further, a sum of the second capacitance of the second sensing patterns SP2-1, SP2-2, and SP2-3 may be defined as a total second capacitance, and a sum of the first resistance values of the second sensing patterns SP2-1, SP2-2, and SP2-3 may be defined as a total second resistance value.

The second capacitance of each of the second sensing patterns SP2-1, SP2-2, and SP2-3 may include self-capacitance and mutual capacitance, and the second resistance value of each of the second sensing patterns SP2-1, SP2-2, and SP2-3 may be a resistance value between both ends of each of the second sensing patterns SP2-1, SP2-2, and SP2-3 based on the first direction DR1.

The second capacitance of the second sensing patterns SP2-1, SP2-2, and SP2-3 may be increased or decreased in the second direction DR2. Further, the second resistance values of the second sensing patterns SP2-1, SP2-2, and SP2-3 may be increased or decreased in the second direction DR2.

Even though a pressure applied to the first second sensing pattern SP2-1, a pressure applied to the second second sensing pattern SP2-2, and a pressure applied to the third second sensing pattern SP2-3 are the same as one another, a variation of the second capacitance of each of the second sensing patterns SP2-1, SP2-2, and SP2-3 may be increased or decreased in the second direction DR2.

Further, even though a pressure applied to the first second sensing pattern SP2-1, a pressure applied to the second second sensing pattern SP2-2, and a pressure applied to the third second sensing pattern SP2-3 are the same as one another, a variation of the second resistance value of each of the second sensing patterns SP2-1, SP2-2, and SP2-3 may be increased or decreased in the second direction DR2.

A particular shape of each of the second sensing patterns SP2-1, SP2-2, and SP2-3 will be described in detail below with reference to FIG. 3B.

Figure 3B:
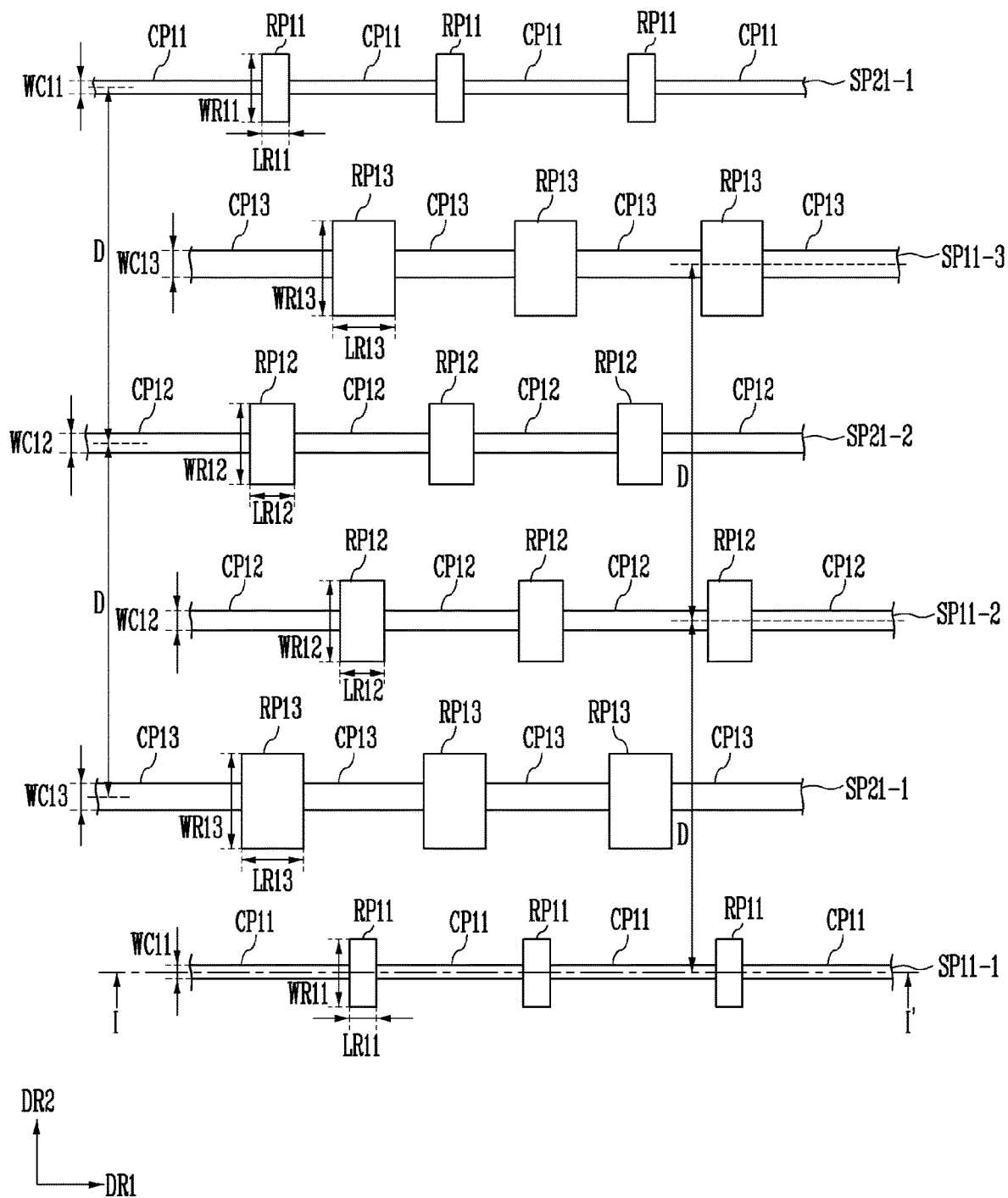
FIG. 3B is a diagram of an exemplary embodiment of first sensing patterns and second sensing patterns of the touch sensor of FIG. 3A.

FIG. 3B is a diagram of an exemplary embodiment of first sensing patterns and second sensing patterns of the touch sensor of FIG. 3A.

Referring to FIG. 3B, the touch sensor includes first sensing patterns SP11-1, SP11-2, and SP11-3 and second sensing patterns SP21-1, SP21-2, and SP21-3 (hereinafter, referred to as SP21).

The second sensing patterns SP2-1, SP2-2, SP2-3 illustrated in FIG. 3A may correspond to second sensing patterns SP21-1, SP21-2, and SP21-3 illustrated in FIG. 3B, respectively.

Referring to FIG. 3A, the first second sensing pattern SP21-1 includes second variable resistive patterns RP13 arranged in a first direction and second conductive patterns CP13 connecting the second variable resistive patterns RP13. The second second sensing pattern SP21-2 includes second variable resistive patterns RP12 arranged in the first direction and second conductive patterns CP12 connecting the second variable resistive patterns RP12. The third second sensing pattern SP21-3 includes second variable resistive patterns RP11 arranged in the first direction and second conductive patterns CP11 connecting the second variable resistive patterns RP11.

Lengths LR13, LR12, and LR11 of the second variable resistive patterns RP13, RP12, and RP11 in the first direction DR1 and widths WR13, WR12, and WR11 of the second variable resistive patterns RP13, RP12, and RP11 in the second direction DR2 may be decreased in the second direction DR2. Widths WC13, WC12, and WC11 of the second conductive patterns CP13, CP12, and CP11 in the second direction DR2 may be decreased in the second direction DR2.

A total area of the second conductive patterns CP13, CP12, and CP11 and a total area of the second variable resistive patterns RP13, RP12, and RP11 of the second sensing patterns SP21-1, SP21-2, and SP21-3 may be decreased in the second direction DR2.

Referring to FIG. 3B, a distance D between the adjacent first second sensing pattern SP21-1 and second second sensing pattern SP21-2 is the same as a distance D between the adjacent second second sensing pattern SP21-2 and third second sensing pattern SP21-3.

A total area of each of the second conductive patterns CP13, CP12, and CP13 and a total area of each of the second variable resistive patterns RP31, RP12, and RP13 may be decreased in the second direction DR2, and the distance D between the adjacent second sensing patterns SP21 may be uniform.

A total area of each of the second conductive patterns CP13, CP12, and CP13 and a total area of each of the second variable resistive patterns RP31, RP12, and RP13 may be decreased in the second direction DR2, and the distance D between the adjacent second sensing patterns may be uniform. Accordingly, the second capacitance of each of the second sensing patterns SP21-1, SP21-2, and SP21-3 may be decreased in the second direction DR2.

Accordingly, even though a pressure applied to the first second sensing pattern SP21-1, a pressure applied to the second second sensing pattern SP21-1, and a pressure applied to the third second sensing pattern SP21-3 are the same as one another, and an area of the first second sensing pattern SP21-1 touched, an area of the second second sensing pattern SP21-2 touched, and an area of the third second sensing pattern SP21-3 touched are the same as one another, a variation of the second capacitance of each of the second sensing patterns SP21-1, SP21-2, and SP21-3 may be decreased in the second direction DR2.

Further, even though an area hovering around the first second sensing pattern SP21-1, an area hovering around the second second sensing pattern SP21-2, and an area hovering around the third second sensing pattern SP21-3 are the same as one another, and a distance between the first second sensing pattern SP21-1 and a hovering object, a distance between the second second sensing pattern SP21-2 and a hovering object, and a distance between the third second sensing pattern SP21-3 and a hovering object are the same as one another, a variation of the second capacitance of each of the second sensing patterns SP21-1, SP21-2, and SP21-3 may be decreased in the second direction DR2.

Even though a pressure applied to the first second sensing pattern SP21-1, a pressure applied to the second second sensing pattern SP21-2, and a pressure applied to the third second sensing pattern SP21-3 are the same as one another, and an area of the first second sensing pattern SP21-1 touched, an area of the second second sensing pattern SP21-2 touched, and an area of the third second sensing pattern SP21-3 touched are the same as one another, an area of the second variable resistive patterns RP12 influenced by the touch is larger than an area of the second variable resistive patterns RP11 influenced by the touch and is be smaller than an area of the second variable resistive patterns RP13 influenced by the touch. Accordingly, a variation of the second resistance value of each of the second sensing patterns SP21-1, SP21-2, and SP21-3 may be increased in the second direction DR2.

FIG. 3B illustrates that the first sensing patterns SP11-1, SP11-2, and SP11-3 include the first variable resistive patterns RP11, RP12, and RP13, and the first conductive patterns CP11, CP12, and CP13 illustrated in FIG. 2A, respectively, and the second sensing patterns SP21-1, SP21-2, and SP21-3 include the second variable resistive patterns RP13, RP12, and RP11 and the second conductive patterns CP13, CP12, and CP11 illustrated in FIG. 2A, respectively. The first sensing patterns SP1-1, SP1-2, and SP1-3 illustrated in FIG. 3A may include the first variable resistive patterns RP21, RP22, and RP23 and the first conductive patterns CP21, CP22, and CP23 illustrated in FIG. 2B, respectively, and the second sensing patterns SP2-1, SP2-2, and SP2-3 illustrated in FIG. 3A may include the second variable resistive patterns RP23, RP22, and RP21, and the second conductive patterns CP23, CP22, and CP21 illustrated in FIG. 2B, respectively.

Figure 3C:
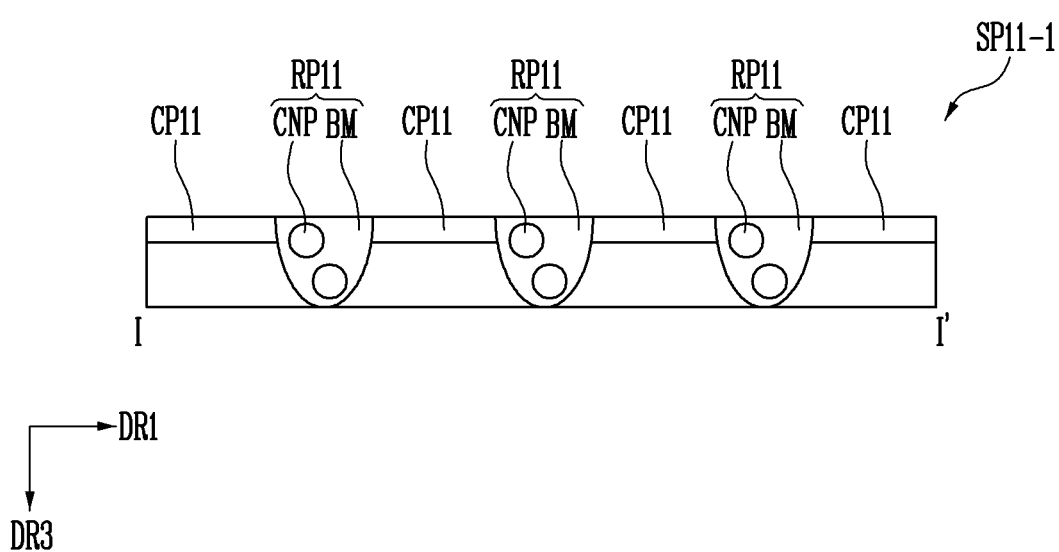
FIG. 3C is a cross-sectional view taken along line I-I' of FIG. 3A.

FIG. 3C is a cross-sectional view taken along line I-I' of FIG. 3A.

Referring to FIG. 3C, the first sensing pattern SP11-1 includes the first variable resistive patterns RP11 and the first conductive patterns CP11, and each of the first variable resistive pattern RP11 includes a base material BM and conductive particles CNP.

The base material BM may have elasticity, be in contact with the adjacent two first conductive patterns CP11, and be transformed by a touch of a user. Further, the base material BM may also have an insulating property.

The base material BM may have a shape of a protrusion extended in a third direction DR3, and the third direction DR3 may cross a plane formed by the extension of the first direction DR1 and the second direction DR2. For example, the first direction DR1, the second direction DR2, and the third direction DR3 may be perpendicular to one another.

The base material BM may be provided in a form of a porous polymer so as to have elasticity. The base material BM may also be provided in a form of a foam (for example, sponge).

The base material BM may include thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienestyrene)], polyurethanes, polychloroprene, polyethylene, silicone, and a combination thereof.

The conductive particles CNP may include nano particles, and the nano particles may be provided in a form of a nano tube, a nano column, a nano rod, a nano pore, a nano wire, and the like.

The conductive particles CNP may include carbon, graphite, a metal, a metalloid, or a conductive oxide of the metal or the metalloid. The metal may include at least one of zinc (Zn), aluminum (Al), chrome (Cr), iron (Fe), nickel (Ni), copper (Cu), molybdenum (Mo), gold (Au), silver (Ag), platinum (Pt), and tungsten (W). The metalloid may include at least one of antimony (Sb), germanium (Ge), and arsenic (As). The conductive oxide may include at least one of an indium tin oxide (ITO), an indium zinc oxide (IZO), an aluminum doped zinc oxide (AZO), a gallium indium zinc oxide (GIZO), and a zinc oxide (ZnO). The conductive particles CNP may include at least one of a carbon nano tube (CNT) and a silver nano wire, but are not limited thereto.

The first conductive patterns CP11 may include carbon, graphite, a metal, a metalloid, or a conductive oxide of the metal or the metalloid.

When a shape of the base material BM of the first variable resistive patterns RP11 is changed by the touch of the user, a distance between the conductive particles CNP may be decreased. By the change in the distance between the conductive particles CNP, resistance values of the first variable resistive patterns RP11 may be changed.

The first first sensing pattern SP11-1 may further include an insulating layer (not illustrated) provided between the first variable resistive patterns RP11.

FIGS. 4A, 4B, 4C, 4D, 4E, and 4F are diagrams of a change in capacitance and a change in a resistance value according to a touch to or a hovering around to the touch sensor of FIG. 3A.

Figure 4A:
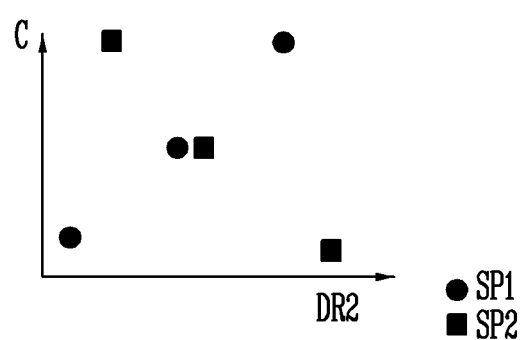
FIGS. 4A, 4B, 4C, 4D, 4E, and 4F are diagrams of a change in capacitance and a change in a resistance value according to a touch to or a hovering for the touch sensor of FIG. 3A.

FIG. 4A is a diagram of a first capacitance of the first sensing patterns SP1 and a second capacitance of the second sensing patterns SP2 when there is no touch and hovering. As described with reference to FIGS. 1 and 3A, the first capacitance of the first sensing patterns SP1-1, SP1-2, and SP1-3 may be increased or decreased in the second direction DR2. Further, the second capacitance of the second sensing patterns SP2-1, SP2-2, and SP2-3 may be increased or decreased in the second direction DR2. Referring to FIG. 4A, the first capacitance of the first sensing patterns SP1-1, SP1-2, and SP1-3 is increased in the second direction DR2, and the second capacitance of the second sensing patterns SP2-1, SP2-2, and SP2-3 is decreased in the second direction DR2.

Figure 4B:
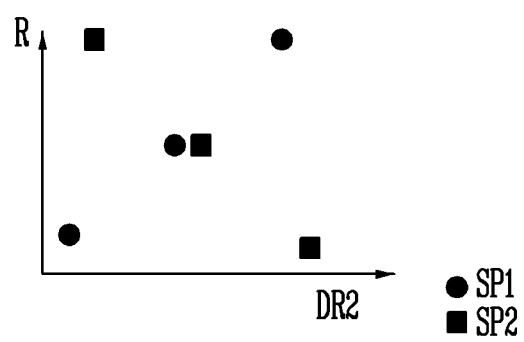

FIG. 4B is a diagram of first resistance values of the first sensing patterns SP1 and second resistance values of the second sensing patterns SP2 when there is no touch and hovering. As described with reference to FIGS. 1 and 3A, the first resistance values of the first sensing patterns SP1-1, SP1-2, and SP1-3 may be increased or decreased in the second direction DR2. Further, the second resistance values of the second sensing patterns SP2-1, SP2-2, and SP2-3 may be increased or decreased in the second direction DR2. Referring to FIG. 4B, the first resistance values of the first sensing patterns SP1-1, SP1-2, and SP1-3 are increased in the second direction DR2, and the second resistance values of the second sensing patterns SP2-1, SP2-2, and SP2-3 are decreased in the second direction DR2.

Figure 4C:
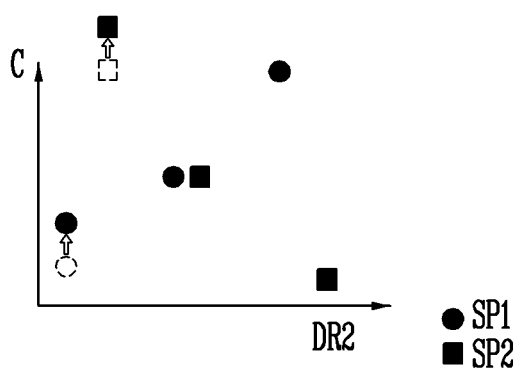

FIG. 4C is a diagram of a first capacitance of the first sensing patterns SP1 and a second capacitance of the second sensing patterns SP2 when a touch or a hovering is generated. For convenience of the description, it is assumed that a touch or a hovering is generated in the first first sensing pattern SP1-1 and the first second sensing pattern SP2-1. A size of the first capacitance of the first first sensing pattern SP1-1 and a size of the second capacitance of the first second sensing pattern SP2-1 may be changed by the touch or the hovering. When the size of the first capacitance of each of the first sensing patterns SP1 is compared with a pre-stored size of first capacitance of each of the first sensing patterns SP1, it may be determined that the touch or the hovering is generated in the first first sensing pattern SP1-1. Further, when the size of the second capacitance of each of the second sensing patterns SP2 is compared with a pre-stored size of second capacitance of each of the second sensing patterns SP2, it may be determined that the touch or the hovering is generated in the first second sensing pattern SP2-1.

Figure 4D:
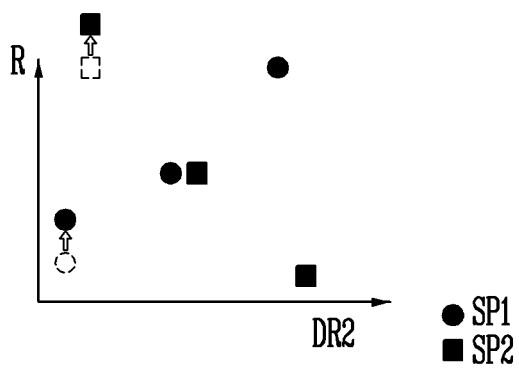

FIG. 4D is a diagram of first resistance values of the first sensing patterns SP1 and second resistance values of the second sensing patterns SP2 when a touch is generated. For convenience of the description, it is assumed that a touch is generated in the first first sensing pattern SP1-1 and the first second sensing pattern SP2-1. A size of the first capacitance of the first first sensing pattern SP1-1 and a size of the second capacitance of the first second sensing pattern SP2-1 are changed by the touch. When the size of the first resistance value of each of the first sensing patterns SP1 is compared with a pre-stored size of first resistance value of each of the first sensing patterns SP1, it may be determined that the touch is generated in the first first sensing pattern SP1-1. Further, when the size of the second resistance value of each of the second sensing patterns SP2 is compared with a pre-stored size of second resistance value of each of the second sensing patterns SP2, it may be determined that the touch is generated in the first second sensing pattern SP2-1.

Figure 4E:
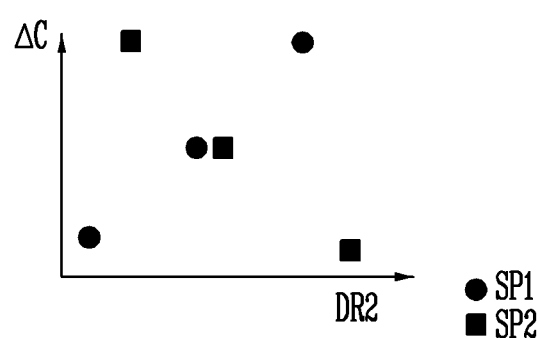

FIG. 4E is a diagram of a change in capacitance when a touch or a hovering is generated in the touch sensor of FIG. 3A. Referring to FIG. 4E, even though a pressure applied to the first first sensing pattern SP1-1, a pressure applied to the second first sensing pattern SP1-2, and a pressure applied to the third first sensing pattern SP1-3 are the same as one another, a variation of the first capacitance of each of the first sensing patterns SP1-1, SP1-2, and SP1-3 may be increased in the second direction DR2. Further, even though a pressure applied to the first second sensing pattern SP2-1, a pressure applied to the second second sensing pattern SP2-2, and a pressure applied to the third second sensing pattern SP2-3 are the same as one another, a variation of the second capacitance of each of the second sensing patterns SP2-1, SP2-2, and SP2-3 may also be increased or decreased in the second direction DR2.

A total first capacitance and a total second capacitance may be simultaneously changed by one touch. For example, referring to FIG. 3A, the touch or the hovering may be simultaneously generated in the first sensing pattern SP1-1 and the second sensing pattern SP2-1, the touch or the hovering may be simultaneously generated in the first sensing pattern SP1-2 and the second sensing pattern SP2-2, and the touch or the hovering may be simultaneously generated in the first sensing pattern SP1-3 and the second sensing pattern SP2-3.

When the first sensing pattern SP1-1 and the second sensing pattern SP2-1 are simultaneously touched, a variation of the total first capacitance may have a smaller value than that of a variation of the total second capacitance. When the first sensing pattern SP1-2 and the second sensing pattern SP2-2 are simultaneously touched, a variation of the total first capacitance may have a similar value to that of a variation of the total second capacitance. When the first sensing pattern SP1-3 and the second sensing pattern SP2-3 are simultaneously touched, a variation of the total first capacitance may have a larger value than that of a variation of the total second capacitance.

A ratio of the variation of the total first capacitance to the variation of the total second capacitance by one touch or hovering may be increased in the second direction. Further, a value obtained by subtracting the variation of the total second capacitance from the variation of the total first capacitance by one touch or hovering may be increased in the second direction. That is, a position of the touch or the hovering by the user may be generated through the comparison between the variation of the total first capacitance and the variation of the total second capacitance.

Figure 4F:
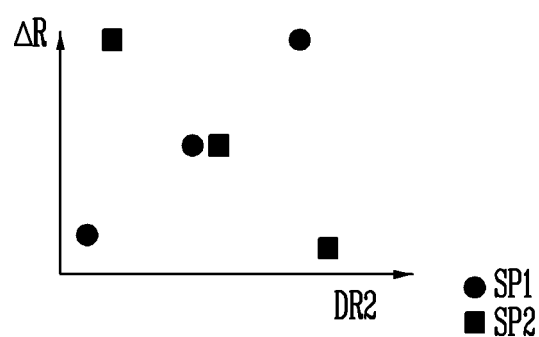

FIG. 4F is a diagram of a change in a resistance value when a touch is generated in the touch sensor.

Referring to FIG. 4F, even though a pressure applied to the first first sensing pattern SP1-1, a pressure applied to the second first sensing pattern SP1-2, and a pressure applied to the third first sensing pattern SP1-3 are the same as one another, a variation of a first capacitance value of each of the first sensing patterns SP1-1, SP1-2, and SP1-3 may be increased in the second direction DR2. Further, even though a pressure applied to the first second sensing pattern SP2-1, a pressure applied to the second second sensing pattern SP2-2, and a pressure applied to the third second sensing pattern SP2-3 are the same as one another, a variation of a second resistance value of each of the second sensing patterns SP2-1, SP2-2, and SP2-3 may be decreased in the second direction DR2.

A ratio of a variation of a total first resistance value to a variation of a total second resistance value by one touch may be increased in the second direction. A value obtained by subtracting a variation of a total second resistance value from a variation of a total first resistance value by one touch may be increased in the second direction. That is, a position of the touch by the user may also be generated through the comparison between the variation of the total first resistance value and the variation of the total second resistance value.

FIG. 5A is a diagram of a touch sensor according to another exemplary embodiment of the present disclosure.

Referring to FIG. 5A, the touch sensor according to another exemplary embodiment of the present disclosure includes first sensing patterns SP1'-1, SP1'-2, and SP1'-3 (hereinafter, referred to as SP1') and second sensing patterns SP2'-1, SP2'-2, and SP2'-3 (hereinafter, referred to as SP2').

The first sensing patterns SP1' and the second sensing patterns SP2' may be extended in a first direction DR1, and may be arranged in a second direction DR2 crossing the first direction DR1.

In the touch sensor described with reference to FIG. 5A, a distance between the two adjacent first sensing patterns SP1' may be decreased in the second direction DR2, and a distance between the two adjacent second sensing patterns SP2' may be increased in the second direction DR2. Two first sensing patterns SP1'-2 and SP1'-3 may be disposed between the adjacent second second sensing pattern SP2'-2 and third second sensing pattern SP2'-3 among the second sensing patterns SP2'.

A variation of a total first capacitance and a variation of a total first resistance value of the first sensing patterns SP1' by each of the touches having the same shape and pressure may be increased in the second direction DR2, and a variation of the total first capacitance of the first sensing patterns SP1' by each of the hoverings having the same shape and distance may be increased in the second direction DR2.

On the other hand, a variation of a total second capacitance and a variation of a total second resistance value of the second sensing patterns SP2' by each of the touches having the same shape and pressure may be decreased in the second direction DR2, and a variation of the total second capacitance of the second sensing patterns SP2' by each of the hoverings having the same shape and distance may be decreased in the second direction DR2.

A particular shape of each of the second sensing patterns SP2'-1, SP2'-2, and SP2'-3 will be described in detail below with reference to FIG. 5B.

Figure 5B:
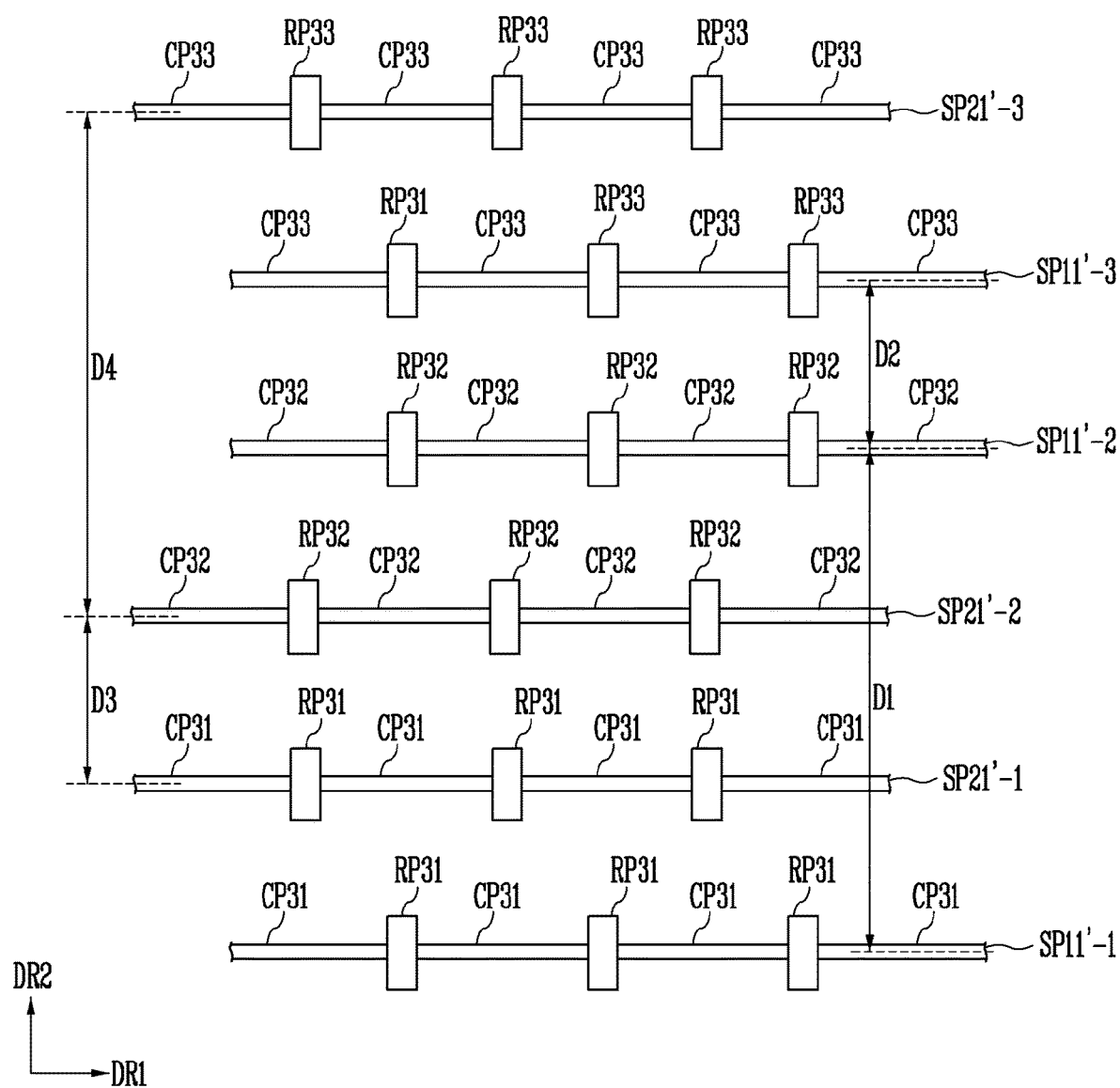
FIG. 5B is a diagram of an exemplary embodiment of first sensing patterns and second sensing patterns of the touch sensor of FIG. 5A.

FIG. 5B is a diagram of an exemplary embodiment of first sensing patterns and second sensing patterns of the touch sensor of FIG. 5A.

Referring to FIG. 5B, the touch sensor includes first sensing patterns SP11'-1, SP11'-2, and SP11'-3 (hereinafter, referred to as SP11') and second sensing patterns SP21'-1, SP21'-2, and SP21'-3 (hereinafter, referred to as SP21'). The first sensing patterns SP11'-1, SP11'-2, and SP11'-3 illustrated in FIG. 4B may correspond to the first sensing patterns SP1'-1, SP1'-2, and SP1'-3 illustrated in FIG. 4A and the second sensing patterns SP21'-1, SP21'-2, and SP21'-3 illustrated in FIG. 4B may correspond to the second sensing patterns SP2'-1, SP2'-2, and SP2'-3 illustrated in FIG. 4A.

Referring to FIG. 5B, the first first sensing pattern SP11'-1 includes first variable resistive patterns RP31 arranged in the first direction and first conductive patterns CP31 connecting the first variable resistive patterns RP31. The second first sensing pattern SP11'-2 includes first variable resistive patterns RP32 arranged in the first direction and first conductive patterns CP32 connecting the first variable resistive patterns RP32. The third first sensing pattern SP11'-3 includes first variable resistive patterns RP33 arranged in the first direction and first conductive patterns CP33 connecting the first variable resistive patterns RP33. The first second sensing pattern SP21'-1 includes second variable resistive patterns RP31 arranged in the first direction and second conductive patterns CP31 connecting the second variable resistive patterns RP31. The second second sensing pattern SP21'-2 includes second variable resistive patterns RP32 arranged in the first direction and second conductive patterns CP32 connecting the second variable resistive patterns RP32. The third second sensing pattern SP21'-3 includes second variable resistive patterns RP33 arranged in the first direction and second conductive patterns CP33 connecting the second variable resistive patterns RP33.

The shapes of the first sensing patterns SP11'-1, SP11'-2, and SP11'-3 may be the same as those of the second sensing patterns SP21'-1, SP21'-2, and SP21'-3.

A distance D1 between the adjacent first first sensing pattern SP11'-1 and second first sensing pattern SP11'-2 may be larger than a distance D2 between the adjacent second first sensing pattern SP11'-2 and third first sensing pattern SP11'-3. That is, the distance between the adjacent first sensing patterns may be decreased in the second direction DR2.

On the other hand, a distance D3 between the adjacent first second sensing pattern SP21'-1 and second second sensing pattern SP21'-2 may be smaller than a distance D4 between the adjacent second second sensing pattern SP21'-2 and third second sensing pattern SP21'-3. That is, the distance between the adjacent second sensing patterns may be increased in the second direction DR2.

Similar to the description with reference to FIG. 2C, the distance between the two adjacent first sensing patterns may be decreased in the second direction DR2, so that a variation of a total first capacitance and a variation of a total first resistance value of the first sensing patterns by the same touch may be increased in the second direction DR2. Further, the distance between the two adjacent second sensing patterns may be increased in the second direction DR2, so that a variation of a total second capacitance and a variation of a total second resistance value of the second sensing patterns by the same touch may be decreased in the second direction DR2.

FIG. 5B illustrates that the first sensing patterns SP11'-1, SP11'-2, and SP11'-3 include the first variable resistive patterns RP31, RP32, and RP33, and the first conductive patterns CP31, CP32, and CP33 illustrated in FIG. 2C, respectively, and the second sensing patterns SP21'-1, SP21'-2, and SP21'-3 include the second variable resistive patterns RP31, RP32, and RP33 and the second conductive patterns CP31, CP32, and CP33 illustrated in FIG. 2C, respectively.

The first sensing patterns SP1'-1, SP1'-2, and SP1'-3 illustrated in FIG. 5A may include the first variable resistive patterns RP11, RP12, and RP13 and the first conductive patterns CP11, CP12, and CP13 illustrated in FIG. 2D, respectively, and the second sensing patterns SP2'-1, SP2'-2, and SP2'-3 illustrated in FIG. 5A may include the second variable resistive patterns RP13, RP12, and RP11, and the second conductive patterns CP13, CP12, and CP11 illustrated in FIG. 2D, respectively. Alternatively, the first sensing patterns SP1'-1, SP1'-2, and SP1'-3 illustrated in FIG. 5A may include the first variable resistive patterns RP21, RP22, and RP23 and the first conductive patterns CP21, CP22, and CP23 illustrated in FIG. 2E, respectively, and the second sensing patterns SP2'-1, SP2'-2, and SP2'-3 illustrated in FIG. 5A may include the second variable resistive patterns RP23, RP22, and RP21, and the second conductive patterns CP23, CP22, and CP21 illustrated in FIG. 2E, respectively.

Figure 6:
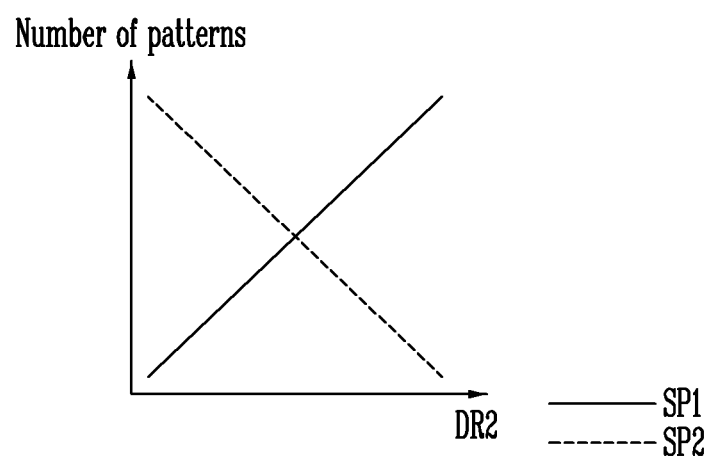
FIG. 6 is a diagram of the number of patterns, of which capacitance or resistance values are changed, when the same touch or hovering is generated in the touch sensor of FIG. 5A.

FIG. 6 is a diagram of the number of patterns, of which capacitance or resistance values are changed when the same touch or hovering is generated in the touch sensor of FIG. 5A.

A distance between the two adjacent first sensing patterns SP1' may be decreased in the second direction DR2, so that the number of first sensing patterns, of which the first capacitance or the first resistance values are changed by the same touch or hovering, may be increased in the second direction DR2.

On the other hand, a distance between the two adjacent second sensing patterns SP2' may be increased in the second direction DR2, so that the number of second sensing patterns, of which the second capacitance or the second resistance values are changed by the same touch or hovering, may be decreased in the second direction DR2.

Accordingly, a variation of a total first capacitance or a variation of a total first resistance value by the same touch or hovering may be increased in the second direction DR2, and a variation of a total second capacitance or a variation of a total second resistance value by the same touch or hovering may be decreased in the second direction DR2.

Figure 7B:
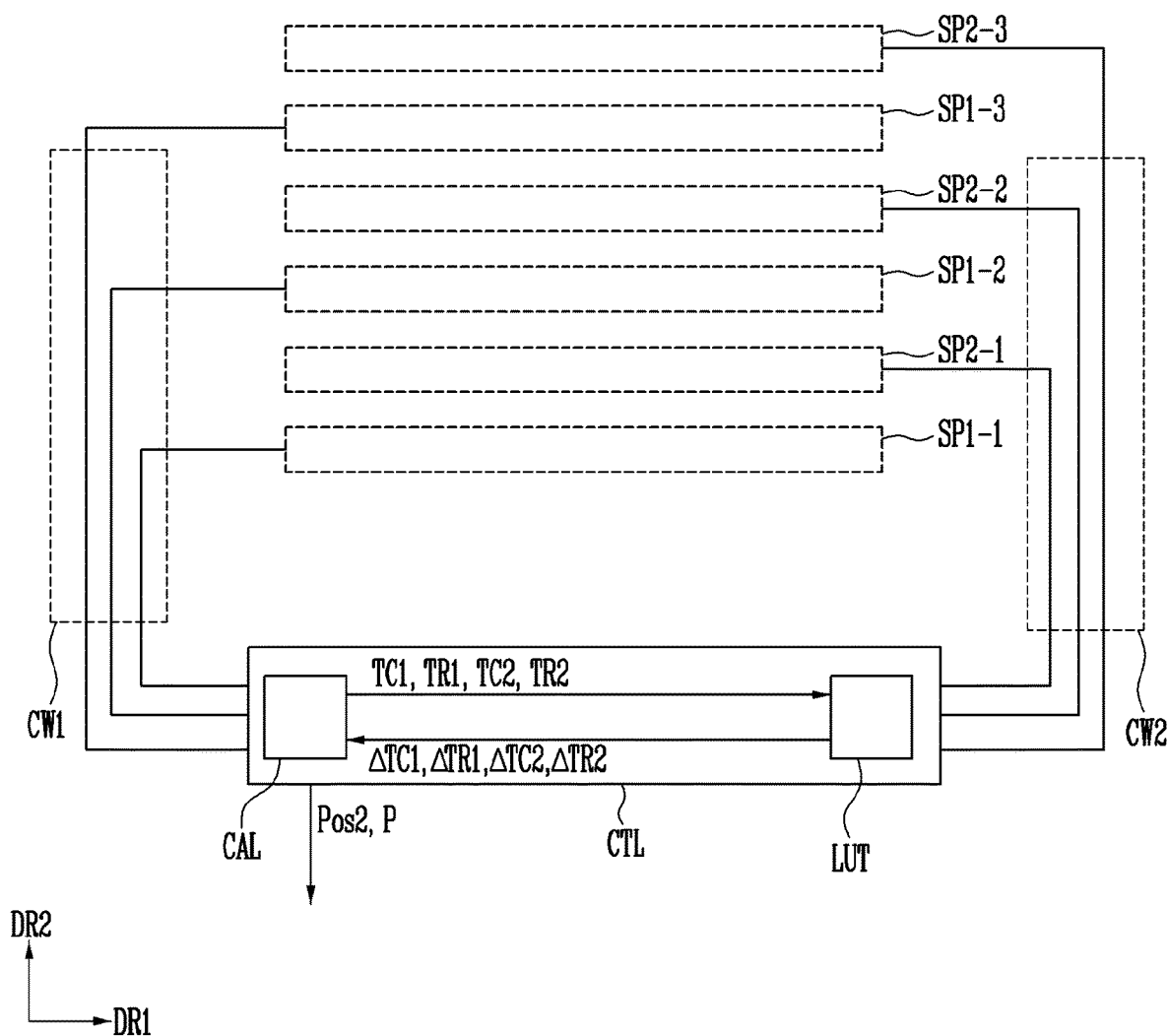

FIGS. 7A and 7B are diagrams for describing a touch sensor according to another exemplary embodiment of the present disclosure.

Referring to FIG. 7A, the touch sensor includes first sensing patterns SP1, second sensing patterns SP2, a controller CTL, first connection wires CW1, and second connection wires CW2.

The controller CTL may calculate coordinates in the second direction DR2 and a pressure P of a touch or a hovering of a user based on voltage values and current values of the first sensing patterns SP1 and the second sensing patterns SP2.

The first connection wires CW1 may connect the first sensing patterns SP1 and the controller CTL, and the second connection wires CW2 may connect the second sensing patterns SP2 and the controller CTL.

The controller CTL may sense a voltage value and a current value of each of the first sensing patterns SP1 and each of the second sensing patterns SP2 in a time division scheme. The controller CTL may include a calculator CAL and a lookup table LUT.

The calculator CAL may generate first capacitance C1 and first resistance values R1 of the first sensing patterns SP1 based on the voltage values and the current values of the first sensing patterns SP1, and may generate second capacitance C2 and second resistance values R2 of the second sensing patterns SP2 based on the voltage values and the current values of the second sensing patterns SP2. The generated first capacitance C1, first resistance values R1, second capacitance C2, and second resistance values R2 may be output to the lookup table LUT.

First capacitance, first resistance values, second capacitance, and second resistance values pre-stored in the lookup table LUT may correspond to first capacitance, first resistance values, second capacitance, and second resistance values, respectively, when there is no touch and hovering.

The lookup table LUT may compare the input first capacitance C1, first resistance values R1, second capacitance C2, and second resistance values R2 with the pre-stored first capacitance, first resistance values, second capacitance, and second resistance values, respectively, and may output a variation ΔC1 of the first capacitance, a variation ΔR1 of the first resistance values, a variation ΔC2 of the second capacitance, and a variation ΔR2 of the second resistance values.

The controller CTL may determine whether the touch sensor is touched or the hovering is generated in the touch sensor based on at least one of the variation ΔC1 of the first capacitance, the variation ΔR1 of the first resistance values, the variation ΔC2 of the second capacitance, and the variation ΔR2 of the second resistance values. Further, the controller CTL may generate a position Pos2 of the touch or the hovering in the second direction DR2 when the touch sensor is touched or the hovering is generated in the touch sensor, and when the touch sensor is touched, the controller CTL may additionally generate a pressure P of the touch.

For example, when the variation ΔC1 of the first capacitance and the variation ΔR1 of the first resistance value of the first sensing pattern SP1-1 are equal to or larger than a pre-stored size, a position Pos2 in the second direction DR2 may be determined based on a position of the first sensing pattern SP1-1 in the second direction DR2. In this case, the controller CTL may determine that the touch sensor is touched. Sensitivity of each of the first sensing patterns SP1-1, SP1-2, and SP1-3 and each of the second sensing patterns SP2-1, SP2-2, and SP2-3 is stored in the controller CTL. Herein, the sensitivity may include the variation of the first capacitance, the variation of the first resistance values, the variation of the second capacitance, and the variation of the second resistance values. The pressure P of the touch may be calculated based on the variation ΔC1 of the first capacitance and the pre-stored sensitivity of the first sensing pattern SP1-1. Alternatively, the pressure P of the touch may be calculated based on the variation ΔR1 of the first resistance value and the pre-stored sensitivity of the first sensing pattern SP1-1.

Further, when the variation ΔC2 of the second capacitance of the second sensing pattern SP2-2 are equal to or larger than a pre-stored size, a position Pos2 in the second direction DR2 may be determined based on a position of the second sensing pattern SP2-2 in the second direction DR2. In this case, the controller CTL may determine that the hovering is generated in the touch sensor.

Referring to FIG. 7B, the touch sensor may include first sensing patterns SP1, second sensing patterns SP2, a controller CTL, first connection wires CW1, and second connection wires CW2.

The controller CTL may simultaneously sense voltage values and current values of the first sensing patterns SP1 and the second sensing patterns SP2. The controller CTL may include a calculator CAL and a lookup table LUT.

The controller CTL may time-divisionally sense or simultaneously sense the voltage values and the current values of the first sensing patterns SP1 and the second sensing patterns SP2. The controller CTL may determine whether to sense the voltage values and the current values of the first sensing patterns SP1 and the second sensing patterns SP2 in the time-division scheme or at the same time based on an input from the outside (not illustrated) or based on satisfaction of a predetermined condition.

The calculator CAL may generate a total first capacitance TC1 and a total first resistance value TR1 based on the voltage values and the current values of the first sensing patterns SP1, and may generate a total second capacitance TC2 and a total second resistance value TR2 based on the voltage values and the current values of the second sensing patterns SP2. The generated total first capacitance TC1, total first resistance value TR1, total second capacitance TC2, and total second resistance value TR2 may be output to the lookup table LUT.

A total first capacitance, a total first resistance value, a total second capacitance, and a total second resistance value pre-stored in the lookup table LUT may correspond to a total first capacitance, a total first resistance value, a total second capacitance, and a total second resistance value, respectively, when there is no touch and hovering.

The lookup table LUT may compare the input total first capacitance TC1, total first resistance value TR1, total second capacitance TC2, and total second resistance value TR2 with the pre-stored total first capacitance, total first resistance value, total second capacitance, and total second resistance value, respectively, and output a variation $\Delta TC1$ of the total first capacitance, a variation $\Delta TR1$ of the total first resistance value, a variation $\Delta TC2$ of the total second capacitance, and a variation $\Delta TR2$ of the total second resistance value.

The controller CTL may determine whether the touch sensor is touched or the hovering is generated in the touch sensor based on at least one of the variation $\Delta TC1$ of the total first capacitance, the variation $\Delta TR1$ of the total first resistance value, the variation $\Delta TC2$ of the total second capacitance, and the variation $\Delta TR2$ of the total second resistance value. Further, the controller CTL may generate a position Pos2 of the touch or the hovering in the second direction DR2 when the touch sensor is touched or the hovering is generated in the touch sensor, and when the touch sensor is touched, the controller CTL may additionally generate a pressure P of the touch.

For example, when the variation $\Delta TC1$ of the total first capacitance, the variation $\Delta TR1$ of the total first resistance value, the variation $\Delta TC2$ of the total second capacitance, and the variation $\Delta TR2$ of the total second resistance value are equal to or larger than pre-stored sizes, the controller CTL may determine that the touch sensor is touched. Additionally referring to FIGS. 4E and 4F, when a size of the variation $\Delta TC1$ of the total first capacitance is similar to a size of the variation $\Delta TC2$ of the total second capacitance, the first sensing pattern SP1-2 and the second sensing pattern SP2-2 may be determined to be touched. The position Pos2 of the touch in the second direction DR2 may be determined based on the positions of the first sensing pattern SP1-2 and the second sensing pattern SP2-2 in the second direction DR2. A pressure P of the touch may be calculated based on the variation $\Delta TC1$ of the total first capacitance, pre-stored sensitivity of the first sensing pattern SP1-2, and pre-stored sensitivity of the second sensing pattern SP2-2. Otherwise, a pressure P of the touch may be calculated based on the variation $\Delta TR1$ of the first resistance value, pre-stored sensitivity of the first sensing pattern SP1-2, and pre-stored sensitivity of the second sensing pattern SP2-2.

Further, when the variation $\Delta TC1$ of the total first capacitance and the variation $\Delta TC2$ of the total second capacitance are equal to or larger than pre-stored sizes, the controller CTL may determine that the hovering is generated in the touch sensor. Additionally referring to FIGS. 3E and 3D, when a size of the variation $\Delta TC1$ of the total first capacitance is larger than a size of the variation $\Delta TC2$ of the total second capacitance, the first sensing pattern SP1-3 and the second sensing pattern SP2-3 may be determined to be touched. The position Pos2 of the hovering in the second direction DR2 may be determined based on the positions of the first sensing pattern SP1-3 and the second sensing pattern SP2-3 in the second direction DR2.

Figure 8B:
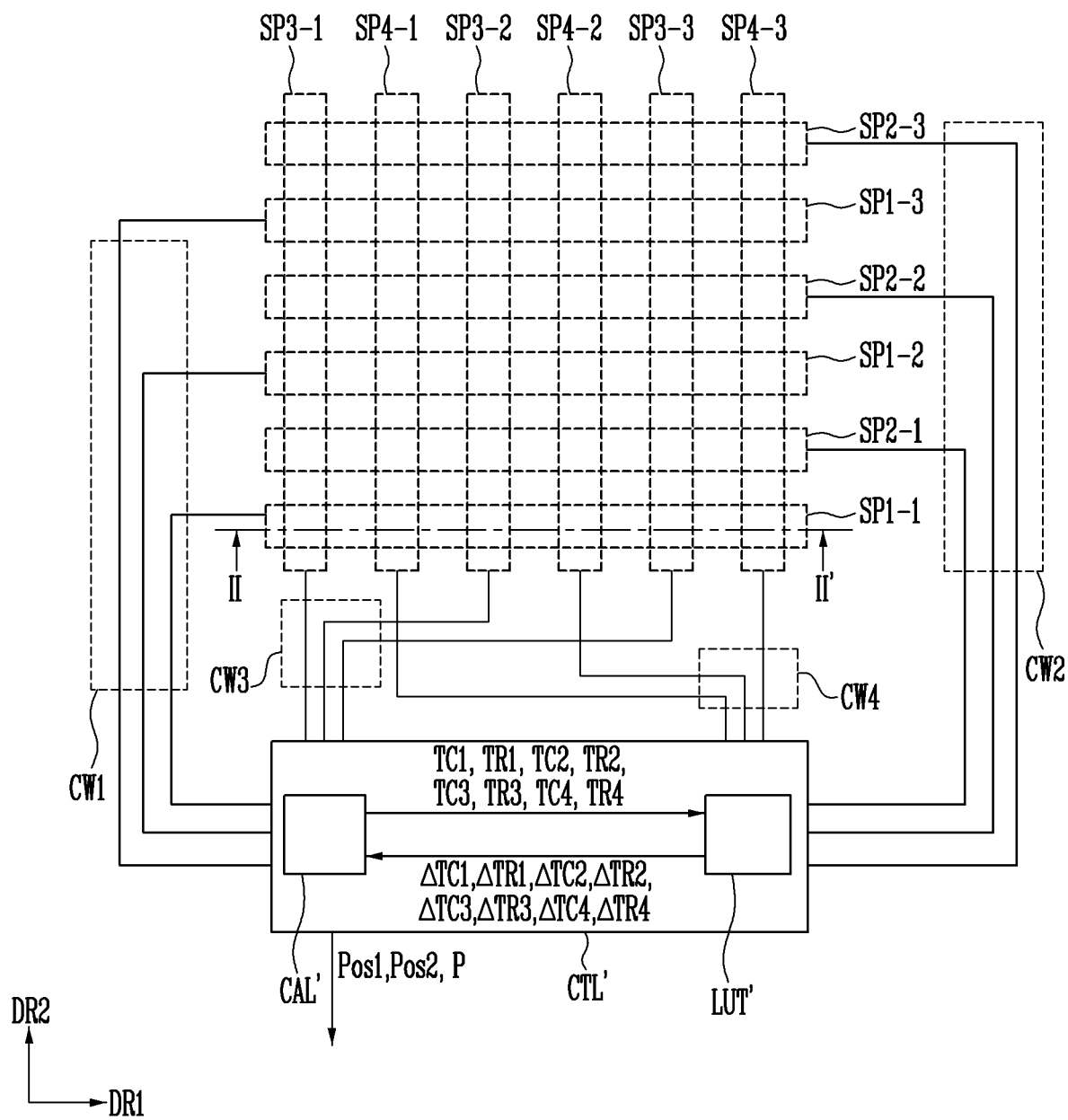

FIGS. 8A and 8B are diagrams for describing a touch sensor according to another exemplary embodiment of the present disclosure.

Referring to FIG. 8A, the touch sensor includes first sensing patterns SP1, second sensing patterns SP2, third sensing patterns SP3-1, SP3-2, and SP3-3 (hereinafter, referred to as SP3), fourth sensing patterns SP4-1, SP4-2, and SP4-3 (hereinafter, referred to as SP4), a controller CTL', first connection wires CW1, second connection wires CW2, third connection wires CW3, and fourth connection wires CW4.

The third sensing patterns SP3 may be extended in a second direction DR2, and may be arranged in a first direction DR1. A shape of each of the third sensing patterns SP3 may be obtained by rotating a shape of each of the first sensing patterns SP1 by an angle (for example, 90°) between the first direction DR1 and the second direction DR2. The third sensing patterns SP3 may be insulated and disposed on the first sensing patterns SP1 and the second sensing patterns SP2.

The fourth sensing patterns SP4 may be extended in the second direction DR2, and may be arranged in the first direction DR1. The third sensing patterns SP3 and the fourth sensing patterns SP4 may be disposed in parallel. A shape of each of the fourth sensing patterns SP4 may be obtained by rotating a shape of each of the first second sensing patterns SP2 by an angle (for example, 90°) between the first direction DR1 and the second direction DR2. The fourth sensing patterns SP4 may be insulated and disposed on the first sensing patterns SP1 and the second sensing patterns SP2.

The third connection wires CW3 may connect the controller CTL' and the third sensing patterns SP3.

The fourth connection wires CW3 may connect the controller CTL' and the fourth sensing patterns SP4.

The controller CTL' may simultaneously sense a voltage value and a current value of the first sensing patterns SP1, the second sensing patterns SP2, the third sensing patterns SP3, and the fourth sensing patterns SP4. The controller CTL' may include a calculator CAL' and a lookup table LUT'.

The calculator CAL' may further generate third capacitance C3 and third resistance values R3 based on the voltage values and the current values of the third sensing patterns SP3, and may generate fourth capacitance C4 and fourth resistance values R4 based on the voltage values and the current values of the fourth sensing patterns SP4, when compared to the calculator CAL. The additionally generated third capacitance C3, third resistance values R3, fourth capacitance C4, and fourth resistance values R4 may be further output to the lookup table LUT'.

Third capacitance values, third resistance values, fourth capacitance values, and fourth resistance values pre-stored in the lookup table LUT' may correspond to third capacitance values, third resistance values, fourth capacitance values, and fourth resistance values, respectively, when there is no touch and hovering.

The lookup table LUT' may compare the additionally input third capacitance C3, third resistance values R3, fourth capacitance C4, and fourth resistance values R4 with pre-stored third capacitance, third resistance values, fourth capacitance, and fourth resistance values, respectively, and may further output a variation $\Delta C3$ of the third capacitance, a variation $\Delta R3$ of the third resistance values, a variation $\Delta C4$ of the fourth capacitance, and a variation $\Delta R4$ of the fourth resistance values, compared to the lookup table LUT.

The controller CTL' may further generate a position Pos1 of the touch or the hovering in the first direction DR1 when the touch sensor is touched or the hovering is generated in the touch sensor, compared to the controller CTL.

The generation of the position Pos1 of the touch point or the hovering in the first direction DR1 through the comparison between the variation $\Delta C3$ of the third capacitance and the variation ΔC4 of the fourth capacitance and the generation of the position Pos1 of the touch point in the first direction DR1 through the comparison between the variation ΔR3 of the third resistance values and the variation ΔR4 of the fourth resistance values may be substantially the same as that described with reference to FIG. 7A.

Referring to FIG. 8B, the touch sensor may include first sensing patterns SP1, second sensing patterns SP2, third sensing patterns SP3, fourth sensing patterns SP4, a controller CTL', first connection wires CW1, second connection wires CW2, third connection wires CW3, and fourth connection wires CW4.

The calculator CAL' may further generate total third capacitance TC3 and a total third resistance value TR3 based on voltage values and the current values of the third sensing patterns SP3, and may further generate total fourth capacitance TC4 and a total fourth resistance value TR4 based on voltage values and current values of the fourth sensing patterns SP4, when compared to the calculator CAL. The additionally generated total third capacitance TC3, total third resistance value TR3, total fourth capacitance TC4, and total fourth resistance value TR4 may be output to the lookup table LUT'.

A total third capacitance, a total third resistance value, a total fourth capacitance, and a total fourth resistance value further pre-stored in the lookup table LUT' compared to the lookup table LUT may correspond to a total third capacitance, a total third resistance value, a total fourth capacitance, and a total fourth resistance value, respectively, when there is no touch and hovering.

The lookup table LUT may compare the further input total third capacitance TC3, total third resistance value TR3, total fourth capacitance TC4, and total fourth resistance value TR4 with the pre-stored total third capacitance, total third resistance value, total fourth capacitance, and total fourth resistance value, respectively, and may output a variation ΔTC3 of total third capacitance, a variation of ΔTR3 total third resistance value, a variation ΔTC4 of total fourth capacitance, and a variation ΔTR4 of total fourth resistance value, when compared to the lookup table LUT.

The controller CTL' may further generate a position Pos1 of the touch or the hovering in the first direction DR1 when the touch sensor is touched or the hovering is generated in the touch sensor, when compared to the controller CTL.

The generation of the position Pos1 of the touch point or the hovering in the first direction DR1 through the comparison between the variation ΔTC3 of the total third capacitance and the variation ΔTC4 of the total fourth capacitance and the generation of the position Pos1 of the touch point in the first direction DR1 through the comparison between the variation ΔTR3 of the total third resistance value and the variation ΔTR4 of the total fourth resistance value may be substantially the same as that described with reference to FIG. 7B.

Figure 8C:
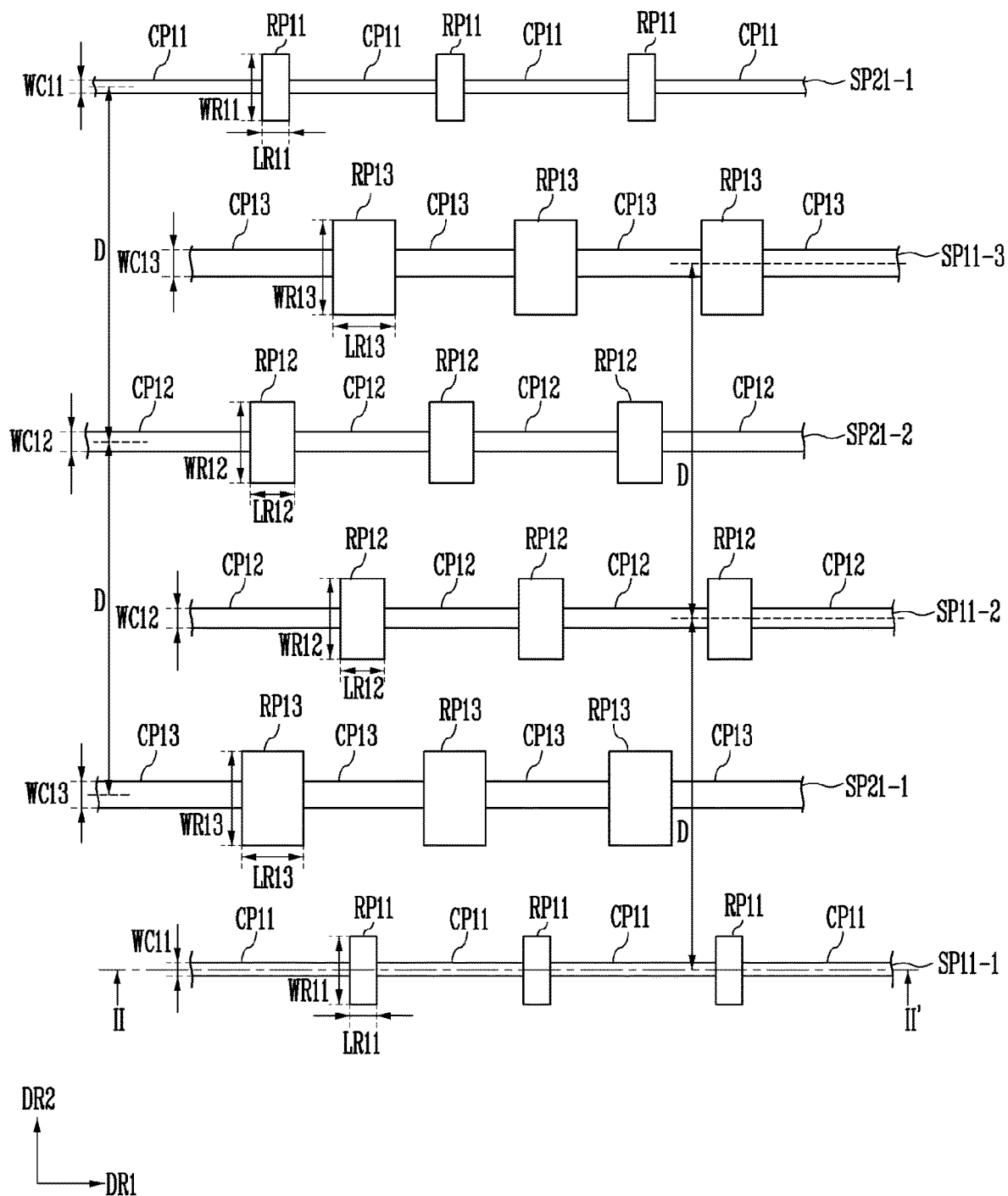
FIG. 8C is a diagram of an exemplary embodiment of first sensing patterns and second sensing patterns of the touch sensor of FIGS. 8A and 8B.

FIG. 8C is a diagram of an exemplary embodiment of first sensing patterns and second sensing patterns of the touch sensor of FIGS. 8A and 8B. FIG. 8C is substantially the same as FIG. 3B, so that a detailed description will be omitted. A position of line I-I' illustrated in FIG. 3B may correspond to a position of line illustrated in FIG. 8B.

FIG. 8D is a diagram of an exemplary embodiment of third sensing patterns and fourth sensing patterns of the touch sensor of FIGS. 8A and 8B.

Referring to FIG. 8B, the touch sensor includes third sensing patterns SP31-1, SP31-2, and SP31-3 (hereinafter, referred to as SP31) and fourth sensing patterns SP41-1, SP41-2, and SP41-3 (hereinafter, referred to as SP41). The third second sensing patterns SP3-1, SP3-2, and SP3-3 illustrated in FIGS. 8A and 8B may correspond to third sensing patterns SP31-1, SP31-2, and SP31-3 illustrated in FIG. 8D, respectively. The fourth sensing patterns SP4-1, SP4-2, and SP4-3 illustrated in FIGS. 8A and 8B may correspond to fourth sensing patterns SP41-1, SP41-2, and SP41-3 illustrated in FIG. 8D, respectively.

The third sensing patterns SP31-1, SP31-2, and SP31-3 may be obtained by rotating the first sensing patterns SP11-1, SP11-2, and SP11-3 by an angle between a first direction DR1 and a second direction DR2.

The fourth sensing patterns SP41-1, SP41-2, and SP41-3 may be obtained by rotating the second sensing patterns SP21-1, SP21-2, and SP21-3 by an angle between the first direction DR1 and the second direction DR2.

A third capacitance and a third resistance value of the third sensing patterns SP31 are substantially the same as the first capacitance and the first resistance value of the first sensing patterns SP11 described with reference to FIG. 3B, and a fourth capacitance and fourth resistance value of the fourth sensing patterns SP41 are substantially the same as the second capacitance and the second resistance value of the second sensing patterns SP21 described with reference to FIG. 3B.

Figure 8E:
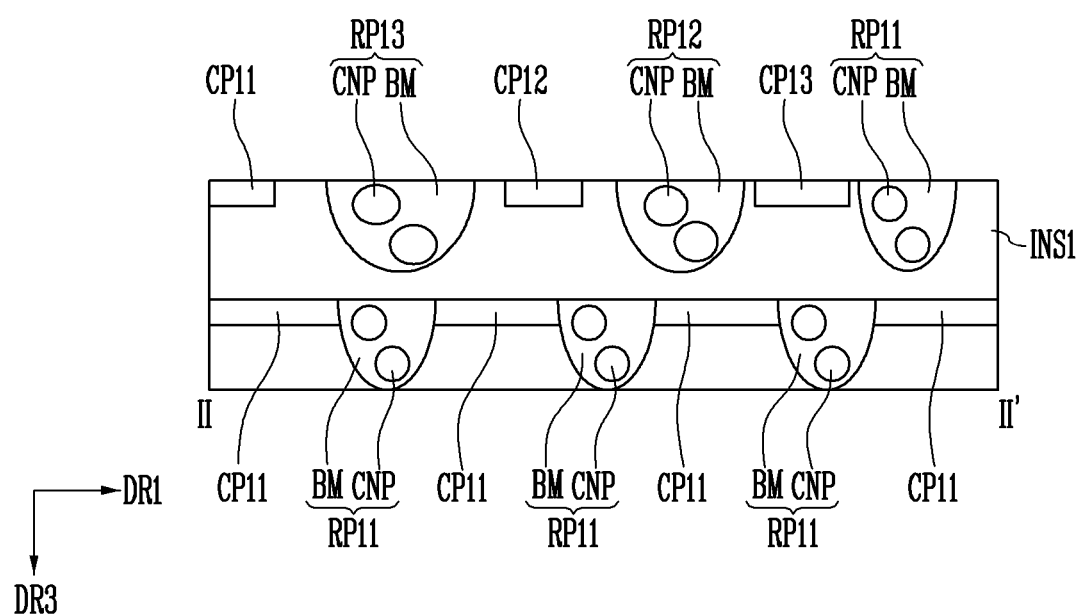
FIG. 8E is a cross-sectional view taken along line II-II' of FIGS. 8A and 8B.

FIG. 8E is a cross-sectional view taken along line of FIGS. 8A and 8B. The cross-sectional view of the first sensing pattern SP11-1 has already been described with reference to FIG. 3C, so that a detailed description will be omitted.

Additionally referring to FIGS. 8C and 8D, a first insulating layer INS1 is disposed on the first sensing pattern SP11-1, and the third sensing patterns SP31-1, SP31-2, and SP31-3 and the fourth sensing patterns SP41-1, SP41-2, and SP41-3 are disposed on the first insulating layer INS1. The third sensing patterns SP31-1, SP31-2, and SP31-3 and the fourth sensing patterns SP41-1, SP41-2, and SP41-3 are disposed while being insulated from the first sensing pattern SP1-1 by the first insulating layer INS1.

Each of the variable resistive patterns RP12 and RP13 may include a base material BM and conductive particles CNP, similar to each of the variable resistance patterns RP11.

The controller CTL, controller CTL', and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, controller CTL, controller CTL', and/or one or more components thereof may include or otherwise be associated with one or more memories (not shown) including code (e.g., instructions) configured to cause the controller CTL, controller CTL', and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor, comprising:
   first sensing patterns extended in a first direction and arranged in a second direction crossing the first direction,
   wherein each of the first sensing patterns comprises:
   first variable resistive patterns arranged in the first direction; and
   first conductive patterns connecting the first variable resistive patterns, and
   lengths of the first variable resistive patterns in the first direction are increased in the second direction.

2. The touch sensor of claim 1, wherein widths of the first variable resistive patterns in the second direction are increased in the second direction.

3. The touch sensor of claim 1, wherein widths of the first variable resistive patterns in the second direction are decreased in the second direction.

4. The touch sensor of claim 3, wherein widths of the first conductive patterns in the second direction are increased in the second direction.

5. The touch sensor of claim 1, further comprising:
   second sensing patterns disposed to be parallel to the first sensing patterns.

6. The touch sensor of claim 5, wherein the first sensing patterns and the second sensing patterns are alternately disposed.

7. The touch sensor of claim 5, wherein a distance between two adjacent first sensing patterns in the second direction is decreased in the second direction,
   a distance between two adjacent second sensing patterns in the second direction is increased in the second direction, and
   two or more first sensing patterns are disposed between two adjacent second sensing patterns.

8. The touch sensor of claim 5, wherein each of the second sensing patterns comprises:
   second variable resistive patterns arranged in the first direction; and
   second conductive patterns connecting the second variable resistive patterns, and
   lengths of the second variable resistive patterns in the first direction are decreased in the second direction.

9. The touch sensor of claim 8, wherein widths of the second variable resistive patterns in the second direction are decreased in the second direction.

10. The touch sensor of claim 9, wherein widths of the second conductive patterns in the second direction are decreased in the second direction.

11. The touch sensor of claim 8, further comprising:
    third sensing patterns disposed on the first sensing patterns while being insulated from the first sensing patterns, extended in the second direction, and arranged in the first direction,
    wherein each of the third sensing patterns comprises:
    third variable resistive patterns arranged in the second direction; and
    third conductive patterns connecting the third variable resistive patterns.

12. The touch sensor of claim 11, wherein widths of the third variable resistive patterns in the first direction are decreased in the first direction.

13. The touch sensor of claim 12, wherein lengths of the third variable resistive patterns in the second direction are increased in the first direction.

14. The touch sensor of claim 13, wherein widths of the third conductive patterns in the first direction are increased in the first direction.

15. The touch sensor of claim 11, further comprising:
    fourth sensing patterns disposed to be parallel to the third sensing patterns.

16. The touch sensor of claim 15, wherein each of the fourth sensing patterns comprises:
    fourth variable resistive patterns arranged in the second direction; and
    fourth conductive patterns connecting the fourth variable resistive patterns, and
    widths of the fourth variable resistive patterns in the first direction are increased in the first direction.

17. The touch sensor of claim 16, wherein lengths of the fourth variable resistive patterns in the second direction are decreased in the first direction.

18. The touch sensor of claim 17, wherein widths of the fourth conductive patterns in the first direction are decreased in the first direction.

19. The touch sensor of claim 16, wherein each of the first, second, third, and fourth variable resistive patterns comprises:
    a base material having elasticity and an insulating property; and
    conductive particles disposed in the base material, and
    the base material is shaped like a protrusion extended in a third direction, and
    the third direction crosses a plane formed by an extension of the first direction and the second direction.

20. The touch sensor of claim 15, further comprising:
    a controller;
    first connection wires connecting the first sensing patterns and the controller;
    second connection wires connecting the second sensing patterns and the controller;
    third connection wires connecting the third sensing patterns and the controller; and
    fourth connection wires connecting the fourth sensing patterns and the controller,
    wherein the controller calculates a total first resistance value of the first sensing patterns, total first capacitance of the first sensing patterns, a total second resistance value of the second sensing patterns, total second capacitance of the second sensing patterns, a total third resistance value of the third sensing patterns, total third capacitance of the third sensing patterns, and a total fourth resistance value of the fourth sensing patterns, and total fourth capacitance of the fourth sensing patterns, and when a user touches the touch sensor or generates a hovering for the touch sensor, the controller generates coordinates of the touch or the hovering in the second direction based on the total first resistance value, the total first capacitance, the total second resistance value, and the total second capacitance, and generates coordinates of the touch or the hovering in the first direction based on the total third resistance value, the total third capacitance, the total fourth resistance value, and the total fourth capacitance.

* * * * *